United States Patent
Inubushi et al.

(10) Patent No.: US 10,391,743 B2
(45) Date of Patent: Aug. 27, 2019

(54) MULTILAYER STRUCTURE, PACKAGING MATERIAL INCLUDING THE SAME, AND METHOD FOR PRODUCING SAID MULTILAYER STRUCTURE

(71) Applicant: KURARAY CO., LTD., Kurashiki-shi (JP)

(72) Inventors: Yasutaka Inubushi, Kurashiki (JP); Yuji Shimizu, Kurashiki (JP); Masakazu Nakaya, Kurashiki (JP)

(73) Assignee: KURRAY CO., LTD., Kurashiki-shi (JP)

( * ) Notice: Subject to any disclaimer, the term of this patent is extended or adjusted under 35 U.S.C. 154(b) by 234 days.

(21) Appl. No.: 15/502,826

(22) PCT Filed: Jul. 1, 2015

(86) PCT No.: PCT/JP2015/003323
§ 371 (c)(1),
(2) Date: Feb. 9, 2017

(87) PCT Pub. No.: WO2016/024381
PCT Pub. Date: Feb. 18, 2016

(65) Prior Publication Data
US 2017/0232709 A1    Aug. 17, 2017

(30) Foreign Application Priority Data

Aug. 13, 2014   (JP) .................. 2014-164645

(51) Int. Cl.
| | |
|---|---|
| *B32B 15/08* | (2006.01) |
| *B32B 15/085* | (2006.01) |
| *B65D 65/40* | (2006.01) |
| *B32B 15/20* | (2006.01) |
| *B32B 27/32* | (2006.01) |
| *B32B 37/15* | (2006.01) |
| *B32B 7/12* | (2006.01) |
| *B32B 27/08* | (2006.01) |
| *B32B 27/10* | (2006.01) |
| *B32B 27/30* | (2006.01) |
| *B32B 27/36* | (2006.01) |
| *B32B 37/12* | (2006.01) |

(52) U.S. Cl.
CPC ............. *B32B 15/085* (2013.01); *B32B 7/12* (2013.01); *B32B 15/20* (2013.01); *B32B 27/08* (2013.01); *B32B 27/10* (2013.01); *B32B 27/308* (2013.01); *B32B 27/32* (2013.01); *B32B 27/36* (2013.01); *B32B 37/15* (2013.01); *B32B 37/153* (2013.01); *B65D 65/40* (2013.01); *B32B 37/1284* (2013.01); *B32B 2255/10* (2013.01); *B32B 2255/12* (2013.01); *B32B 2255/20* (2013.01); *B32B 2255/205* (2013.01); *B32B 2255/26* (2013.01); *B32B 2255/28* (2013.01); *B32B 2307/7242* (2013.01); *B32B 2307/7244* (2013.01); *B32B 2307/7246* (2013.01); *B32B 2439/06* (2013.01); *B32B 2439/40* (2013.01); *B32B 2439/46* (2013.01); *B32B 2439/60* (2013.01); *B32B 2439/62* (2013.01); *B32B 2439/70* (2013.01); *B32B 2457/04* (2013.01); *B32B 2509/00* (2013.01); *B32B 2553/00* (2013.01); *B32B 2605/003* (2013.01); *B32B 2607/00* (2013.01)

(58) Field of Classification Search
CPC ......... B32B 7/12; B32B 15/085; B32B 15/20; B32B 27/08; B32B 27/10; B32B 27/308; B32B 27/32; B32B 27/36; B32B 37/15; B32B 37/153; B65D 65/40
USPC .......... 428/323, 461, 464, 469, 472.2, 472.3
See application file for complete search history.

(56) References Cited

U.S. PATENT DOCUMENTS

| | | |
|---|---|---|
| 7,955,700 B2 | 6/2011 | Agata |
| 2010/0255365 A1 | 10/2010 | Suzuta |
| 2011/0232726 A1 | 9/2011 | Aiba |
| 2013/0034674 A1 | 2/2013 | Yoshida et al. |
| 2017/0129216 A1 | 5/2017 | Shimizu et al. |

FOREIGN PATENT DOCUMENTS

| | | |
|---|---|---|
| CN | 104968495 A | 10/2015 |
| CN | 104968496 A | 10/2015 |
| CN | 105026150 A | 11/2015 |
| CN | 106660323 A | 5/2017 |
| EP | 2 202 823 A1 | 6/2010 |
| EP | 3 165 359 A1 | 5/2017 |
| JP | 2003-251732 A | 9/2003 |
| JP | 2007-290369 A | 11/2007 |

(Continued)

OTHER PUBLICATIONS

International Search Report dated Oct. 6, 2015, in PCT/JP2015/003323, filed Jul. 1, 2015.

(Continued)

*Primary Examiner* — Edward J Cain
(74) *Attorney, Agent, or Firm* — Oblon, McClelland, Maier & Neustadt, L.L.P.

(57) ABSTRACT

The present invention provides a novel multilayer structure including a layered product capable of maintaining high performance even after being subjected to extrusion coating lamination. The present invention relates to a multilayer structure including a layered product and a layer (H) stacked on the layered product. The layered product includes a base (X), a layer (Z) containing an aluminum atom, and a layer (Y) containing a compound (A) containing a phosphorus atom. The layer (H) contains a thermoplastic resin (U), and the thermoplastic resin (U) is a polymer containing an α-olefin unit.

17 Claims, 4 Drawing Sheets

(56) References Cited

FOREIGN PATENT DOCUMENTS

| JP | 2011-200780 A | 10/2011 |
|----|---------------|---------|
| JP | 2013-208794 A | 10/2013 |
| JP | 2014-74096 A  | 4/2014  |
| JP | 2014-118495 A | 6/2014  |
| JP | 2014-124794 A | 7/2014  |
| WO | 2011/122036 A1 | 10/2011 |

OTHER PUBLICATIONS

Extended European Search Report dated Mar. 8, 2018 in Patent Application No. 15832519.1, 9 pages.

MULTILAYER STRUCTURE, PACKAGING MATERIAL INCLUDING THE SAME, AND METHOD FOR PRODUCING SAID MULTILAYER STRUCTURE

TECHNICAL FIELD

The present invention relates to a multilayer structure, a packaging material including the same, and a method for producing the multilayer structure.

BACKGROUND ART

Layered products in which a gas barrier layer containing aluminum or aluminum oxide as a component is formed on a plastic film have been conventionally well-known. Such layered products are used as packaging materials for protecting articles (such as foods) which are susceptible to quality change induced by oxygen. In many cases, such a gas barrier layer is formed on a plastic film by a dry process such as physical or chemical vapor deposition. Aluminum-deposited films have light shielding properties as well as gas barrier properties and are typically used as packaging materials for dry foods. Aluminum oxide-deposited films, which have transparency, are characterized by allowing visual recognition of contained substances and by enabling check for foreign matters with a metal detector and heating with a microwave oven. These films are thus used as packaging materials in a wide variety of applications such as retort food packaging.

For example, Patent Literature 1 discloses a gas barrier layer containing aluminum, the gas barrier layer being a transparent gas barrier layer composed of aluminum atoms, oxygen atoms, and sulfur atoms. Patent Literature 1 discloses a method for forming the transparent gas barrier layer by reactive sputtering.

Patent Literature 2 discloses a transparent gas barrier layer composed of a reaction product of aluminum oxide particles and a phosphorus compound. Patent Literature 2 discloses a method for forming the gas barrier layer, in which a coating liquid containing aluminum oxide particles and a phosphorus compound is applied onto a plastic film, then dried and heat-treated.

When the layered product is used as a packaging material, a laminated film composed of the layered product and polyethylene laminated thereon with an adhesive is usually used to impart additional properties such as heat-sealing properties. An example of the method for producing such a laminated film is extrusion coating lamination in which an adhesive is applied to one surface of the multilayer structure using a coater and molten polyethylene is laminated on the adhesive.

However, the present inventors have found that when the layered product is subjected to extrusion coating lamination, the gas barrier properties of the resulting multilayer structure may deteriorate. There has thus been a demand for a multilayer structure capable of maintaining high barrier properties even after being formed by extrusion coating lamination.

CITATION LIST

Patent Literature

Patent Literature 1: JP 2003-251732 A
Patent Literature 2: WO 2011/122036 A1

SUMMARY OF INVENTION

Technical Problem

An object of the present invention is to provide: a novel multilayer structure including a layered product capable of maintaining high performance even after being subjected to extrusion coating lamination; a packaging material including the multilayer structure; and a method for producing the multilayer structure.

Solution to Problem

Through a detailed study, the present inventors have found that a layered product including particular layers can achieve the above object and have completed the present invention.

The present invention provides a multilayer structure. The multilayer structure is a multilayer structure including a layered product and a layer (H) stacked on the layered product. The layered product includes a base (X), a layer (Z) containing an aluminum atom, and a layer (Y) containing a compound (A) containing a phosphorus atom. The layer (H) contains a thermoplastic resin (U), and the thermoplastic resin (U) is a polymer containing an α-olefin unit.

In the multilayer structure of the present invention, the layered product may include at least one pair of the layer (Z) and the layer (Y) that are disposed contiguous to each other.

In the multilayer structure of the present invention, the layer (Z) may include a layer (Z1) containing a reaction product (E). The reaction product (E) is a reaction product formed by a reaction between a metal oxide (C) containing an aluminum atom and a phosphorus compound (D). In an infrared absorption spectrum of the layer (Z1), a maximum absorption wavenumber in a region of 800 to 1,400 cm$^{-1}$ is 1,080 to 1,130 cm$^{-1}$.

In the multilayer structure of the present invention, the layer (Z) may include a deposited layer (Z2) of aluminum or a deposited layer (Z3) of aluminum oxide.

In the multilayer structure of the present invention, the compound (A) may be a polymer (Aa) having at least one functional group selected from the group consisting of a phosphoric acid group, a phosphorous acid group, a phosphonic acid group, a phosphonous acid group, a phosphinic acid group, and a phosphinous acid group.

In the multilayer structure of the present invention, the base (X) may include at least one selected from the group consisting of a thermoplastic resin film layer and a paper layer.

In the multilayer structure of the present invention, the thermoplastic resin (U) may be polyethylene. In the multilayer structure of the present invention, the thermoplastic resin (U) may be a copolymer containing an α-olefin unit and a vinyl monomer unit having a polar group. In this case, the vinyl monomer unit having a polar group may be a vinyl monomer unit having a carboxyl group.

In the multilayer structure of the present invention, the compound (A) may be poly(vinylphosphonic acid).

In the multilayer structure of the present invention, the layer (H) may be a layer formed by extrusion coating lamination.

The multilayer structure of the present invention may have an oxygen transmission rate of 2 mL/(m$^2$·day·atm) or less at 20° C. and 85% RH.

The present invention provides a packaging material. The packaging material includes the multilayer structure of the present invention.

The present invention provides a method for producing a multilayer structure. This method is a method for producing the multilayer structure including a layered product and a layer (H) stacked on the layered product, the method including: a first step of forming the layered product including a base (X), a layer (Z) containing an aluminum atom, and a layer (Y) containing a compound (A) containing a phosphorus atom; and a second step of forming the layer (H) stacked on at least one surface of the layered product by extruding a molten thermoplastic resin (U) onto the surface of the layered product.

In the production method of the present invention, the first step includes: a step (Y-i) of preparing a coating liquid (S) containing the compound (A) and a solvent; and a step (Y-ii) of forming the layer (Y) on the layer (Z) using the coating liquid (S).

In the production method of the present invention, in the first step, the layer (Z) and the layer (Y) may be formed contiguous to each other.

Advantageous Effects of Invention

In the present invention, a layered product capable of maintaining high performance even after being subjected to extrusion coating lamination is used, and therefore a multilayer structure and a packaging material having excellent properties can be obtained.

DESCRIPTION OF EMBODIMENTS

Figure 1:
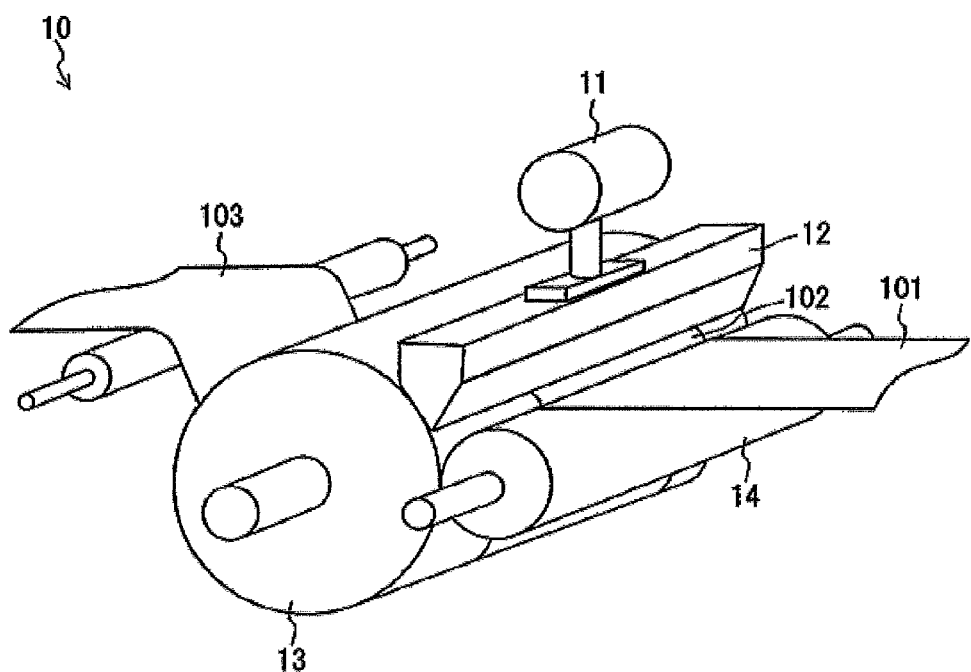
FIG. 1 is a perspective view schematically showing a part of an extrusion coating lamination apparatus.

Hereinafter, the present invention will be described with reference to examples. The following description gives examples of materials, conditions, techniques, and value ranges; however, the present invention is not limited to those mentioned as examples. The materials given as examples may be used alone or may be used in combination with one another, unless otherwise specified.

Unless otherwise specified, the meaning of an expression like "a particular layer is stacked on a particular member (such as a base or layer)" as used herein encompasses not only the case where the particular layer is stacked in direct contact with the member but also the case where the particular layer is stacked above the member, with another layer interposed therebetween. The same applies to expressions like "a particular layer is formed on a particular member (such as a base or layer)" and "a particular layer is disposed on a particular member (such as a base or layer)". Unless otherwise specified, the meaning of an expression like "a liquid (such as a coating liquid) is applied onto a particular member (such as a base or layer)" encompasses not only the case where the liquid is applied directly to the member but also the case where the liquid is applied to another layer formed on the member.

Herein, a layer may be termed "layer (Y)" using a reference character "(Y)" to differentiate the layer from other layers. The reference character "(Y)" has no technical meaning, unless otherwise specified. The same applies to other reference characters used in the terms such as "base (X)", "layer (Z)", and "compound (A)". However, an exception is made for the terms such as "hydrogen atom (H)" in which the reference character obviously represents a specific element.

[Multilayer Structure]

The multilayer structure of the present invention includes a layered product and a layer (H) stacked on the layered product. The layered product includes a base (X), a layer (Z) containing an aluminum atom, and a layer (Y) containing a compound (A) containing a phosphorus atom. The term "layered product" as used in the following description refers to a layered product that includes the base (X), the layer (Z), and the layer (Y), unless otherwise specified. This layered product is described later.

[Layer (H)]

The layer (H) contains a thermoplastic resin (U) and typically consists only of the thermoplastic resin (U). The proportion of the thermoplastic resin (U) in the layer (H) may be in the range of 50 mass % to 100 mass % (e.g, 80 mass % to 100 mass %). The layer (H) may contain an additional component (a component other than the thermoplastic resin (U)) without any particular limitation as long as the effect of the present invention is obtained. Examples of the additional component include an anti-blocking agent, an antioxidant, a weathering stabilizer, an antistatic agent, a mold release agent, a flame retardant, a wax, an antifungal agent, an antibacterial agent, a filler, and a foaming agent.

The thermoplastic resin (U) is a polymer containing at least one of α-olefin unit. The thermoplastic resin (U) is not particularly limited as long as it is a polymer containing an α-olefin unit. The thermoplastic resin (U) may be a resin that is commonly used in extrusion coating lamination. The thermoplastic resin (U) can be obtained by polymerizing a monomer containing at least one type of α-olefin. The proportion of α-olefin units in the total structural units of the thermoplastic resin (U) may be in the range of 50 mol % to 100 mol % (e.g., in the range of 80 mol % to 100 mol %).

Examples of α-olefins that are converted to α-olefin units by polymerization include α-olefins having 2 to 12 carbon atoms (preferably 2 to 8 carbon atoms) such as ethylene, propene, 1-butene, 1-hexene, 3-methyl-1 pentene, and 1-octene. The polymer containing an α-olefin unit may be a copolymer obtained by copolymerizing an α-olefin with a monomer other than the α-olefin as long as the effect of the present invention is not impaired. Examples of monomers that may be copolymerized with α-olefins include vinyl monomer units having a polar group. When a vinyl monomer unit having a polar group, a maleic anhydride, or its derivative is used, the layer (H) can be bonded to the layered product without an adhesive layer. Examples of the polar group include a hydroxy group, a carboxyl group and its salts, and carboxylic acid anhydrides. Examples of monomers that are converted to vinyl monomer units having a polar group by polymerization (including polymerization followed by hydrolysis) include (meth)acrylic acid and vinyl acetate.

The thermoplastic resin (U) may be a copolymer containing an α-olefin unit and a vinyl monomer unit having a polar group, or a copolymer consisting only of an α-olefin unit and a vinyl monomer unit having a polar group. The molar ratio between the α-olefin units and the vinyl monomer units having a polar group in the copolymer, as expressed by (α-olefin units):(vinyl monomer units having a polar group), may be in the range of 50:50 to 99:1.

Examples of the thermoplastic resin (U) include polyethylene, polypropylene, ethylene-acrylic acid copolymer, ethylene methacrylic acid copolymer, ethylene-acrylic acid-acrylic acid ester terpolymer, ethylene-methacrylic acid-acrylic acid ester terpolymer, ethylene-acrylic acid-methacrylic acid ester terpolymer, ethylene-methacrylic acid-methacrylic acid ester terpolymer, ethylene-acrylic acid ester-acid anhydride (such as maleic anhydride) terpolymer, and ethylene-methacrylic acid ester-acid anhydride (such as maleic anhydride) terpolymer.

The layer (H) may be stacked on one surface of the layered product, or the layers (H) may be stacked on both surfaces of the layered product. Preferably, the layer (H) is stacked on the layer (Y) (that is, contiguous to the layer (Y)). In the case where the multilayer structure include two or more layers (H), they may be the same as or different from each other. The thickness of the layer (H) is not particularly limited, and it may be in the range of 1 µm to 250 µm (e.g., in the range of 5 µm to 150 µm).

[Method for Producing Multilayer Structure]

An example of the method for producing the multilayer structure of the present invention will be described. The features described for the multilayer structure of the present invention can be applied to this production method and may not be described repeatedly. The features described for this production method can be applied to the multilayer structure of the present invention.

This production method includes: a first step of forming a layered product including a base (X), a layer (Z), and a layer (Y); and a second step of forming a layer (H) stacked on at least one surface of the layered product by extruding a molten thermoplastic resin (U) onto the surface of the layered product. In the first step, the layer (Z) and the layer (Y) may be formed contiguous to each other. The details of the process of forming the layered product (first step) will be described later. The second step is not particularly limited, and a commonly-known extrusion coating lamination may be applied to the second step.

The temperature at which the thermoplastic resin (U) is melted can be determined as appropriate according to the melting point of the resin used, and the temperature is preferably 120 to 330° C., and more preferably 150 to 330° C.

[Extrusion Coating Lamination]

The method for extrusion coating lamination that can be used in the present invention is not particularly limited, and any commonly-known method can be used. In a typical method for extrusion coating lamination, a molten thermoplastic resin is fed to a T-die, and the thermoplastic resin is extruded through a flat slit of the T-die and then cooled to produce a laminated film.

An example of single lamination, which is the most common method for extrusion coating lamination, will now be described with reference to the drawings. An example of the apparatus used in single lamination is shown in FIG. 1. FIG. 1 schematically shows only a key part of the apparatus, and actual apparatuses are different from that shown in FIG. 1. The apparatus 10 shown in FIG. 1 includes an extruder 11, a T-die 12, a cooling roll 13, and a rubber roll 14. The cooling roll 13 and the rubber roll 14 are arranged in such a manner that their roll surfaces are in contact with each other.

A thermoplastic resin is heated and melted in the extruder 11, and then extruded through the flat slit of the T-die 12 into a resin film 102. This resin film 102 is used as a layer (H) containing the thermoplastic resin (U). Meanwhile, a layered product 101 is delivered from a sheet feeder (not shown) and is pressed, together with the resin film 102, between the cooling roll 13 and the rubber roll 14. The layered product 101 and the resin film 102, stacked on each other, are pressed together between the cooling roll 13 and the rubber roll 14 to produce a laminated film (multilayer structure) 103 including the layered product 101 and the resin film 102 united together.

Examples of the method for extrusion coating lamination other than the above single lamination include sandwich lamination and tandem lamination. The sandwich lamination is a method in which a molten thermoplastic resin is extruded onto a first base supplied from an unwinder (feed roll) and is laminated to a second base supplied from another unwinder. The tandem lamination is a method in which two single-lamination machines connected together are used to produce a layered product consisting of five layers at a time.

The use of the layered product previously described allows fabrication of a multilayer structure capable of maintaining high gas barrier performance even after extrusion coating lamination. The mechanism by which the resistance to physical stresses is increased has not yet been elucidated, but perhaps the presence of the layer (Y) in the layered product may reduce stresses applied to the layer (Z) when the layered product is exposed to physical stresses (such as deformation due to thermal contraction of the base (X) during extrusion coating lamination and stretching during delivery). However, regardless of whether this mechanism works or not, multilayer structures that meet the requirements of the present invention are included in the technical scope of the present invention.

[Layered Product]

Hereinafter, the layered product that is used in the present invention will be described. As described above, the layered product of the present invention includes a base (X), a layer (Z) containing an aluminum atom, and a layer (Y) containing a compound (A) containing a phosphorus atom. The term "layered product of the present invention" as used in the following description refers to a "layered product that is used in the present invention".

In the layer (Y), at least a portion of the compound (A) and at least a portion of the polymer (B) may have undergone a reaction. When the compound (A) has undergone a reaction in the layer (Y), a moiety derived from the compound (A) in the reaction product is regarded as the compound (A). In this case, the mass of the compound (A) used in the formation of the reaction product (the mass of the compound (A) that has yet to undergo the reaction) is included in the mass of the compound (A) in the layer (Y). When the polymer (B) has undergone a reaction in the layer (Y), a moiety derived from the polymer (B) in the reaction product is regarded as the polymer (B). In this case, the mass of the polymer (B) used in the formation of the reaction product (the mass of the polymer (B) that has yet to undergo the reaction) is included in the mass of the polymer (B) in the layer (Y).

The polymer (B) typically contains no phosphorus atoms. More specifically, the polymer (B) does not contain the phosphorus atom-containing functional group described later. A compound possessing the features of both the compound (A) and the polymer (B) is regarded as the compound (A) in the calculation of the mass ratio.

In the layer (Y), the mass ratio between the compound (A) and the polymer (B) may be in the range of 20:80 to 99:1, in the range of 60:40 to 99:1, or in the range of 70:30 to 91:9. The base (X) and the layer (Y) will hereinafter be described.

[Base (X)]

The material of the base (X) is not particularly limited, and a base made of any of various materials can be used. Examples of the material of the base (X) include: resins such as thermoplastic resins and thermosetting resins; fiber assemblies such as fabrics and paper; wood; and glass. Among these, thermoplastic resins and paper are preferred. The base (X) in a preferred example includes at least one selected from the group consisting of a thermoplastic resin film layer and a paper layer. The base (X) may be a composite made of a plurality of materials and may be a single-layer or multilayer base. The form of the base (X) is not particularly limited. The base (X) may be a laminar base such as a film or sheet.

Examples of thermoplastic resins that may be used in the base (X) include: polyester resins such as polyethylene terephthalate, polyethylene-2,6-naphthalate, polybutylene terephthalate, and copolymers thereof; and polyamide resins such as nylon-6, nylon-66, and nylon-12. When the multilayer structure is used as or in a packaging material, the material of the base (X) is preferably at least one thermoplastic resin selected from the group consisting of polyethylene terephthalate, nylon-6, and nylon-66.

When a film made of such a thermoplastic resin is used as the base (X), the base (X) may be an oriented film or non-oriented film. In terms of high suitability for processes (such as suitability for printing or lamination) of the resulting multilayer structure, an oriented film, particularly a biaxially-oriented film, is preferred. The biaxially-oriented film may be a biaxially-oriented film produced by any one method selected from simultaneous biaxial stretching, sequential biaxial stretching, and tubular stretching.

Examples of the paper that may be used in the base (X) include kraft paper, high-quality paper, simili paper, glassine paper, parchment paper, synthetic paper, white paperboard, manila board, milk carton board, cup paper, and ivory paper. The use of paper in the base makes it possible to obtain a multilayer structure for a paper container.

When the base (X) is in the form of a layer, the thickness of the base (X) is preferably in the range of 1 to 1,000 µm, more preferably in the range of 5 to 500 µm, and even more preferably in the range of 9 to 200 µm, in terms of high mechanical strength and good processability of the resulting multilayer structure.

[Layer (Y)]

The layer (Y) contains the compound (A) and may further contain the polymer (B). The compound (A) is a compound containing a phosphorus atom. The polymer (B) has a hydroxy group and/or carboxyl group. The compound (A) and the polymer (B) will be described hereinafter.

[Compound (A)]

Examples of the compound (A) containing a phosphorus atom include phosphorus oxoacids and their derivatives. Examples of the derivatives of phosphorus oxoacids include: compounds having at least one functional group selected from the group consisting of a phosphoric acid group, a phosphorous acid group, a phosphonic acid group, a phosphonous acid group, a phosphinic acid group, and a phosphinous acid group; and derivatives (salts, (partial) esters, halides (e.g., chlorides), and dehydration products) of such compounds.

Examples of the compound (A) containing a phosphorus atom include: phosphorus oxoacids such as phosphoric acid, diphosphoric acid, triphosphoric acid, polyphosphoric acid formed by condensation of 4 or more molecules of phosphoric acid, phosphorous acid, phosphonic acid, phosphonous acid, phosphinic acid, and phosphinous acid; derivatives of these oxoacids (e.g., salts, (partial) esters, halides (such as chlorides), and dehydration products (such as phosphorus pentoxide)); and a polymer (Aa) having a predetermined functional group containing a phosphorus atom. Examples of the polymer (Aa) include polymers having at least one functional group selected from the group consisting of a phosphoric acid group, a phosphorous acid group, a phosphonic acid group, a phosphonous acid group, a phosphinic acid group, and a phosphinous acid group. The functional group of the polymer (Aa) is preferably a phosphoric acid group and/or phosphonic acid group, and more preferably a phosphonic acid group.

Examples of the polymer (Aa) include: polymers of phosphono(meth)acrylic acid esters such as 6-[(2-phosphonoacetyl)oxy]hexyl acrylate, 2-phosphonooxyethyl methacrylate, phosphonomethyl methacrylate, 11-phosphonoundecyl methacrylate, and 1,1-diphosphonoethyl methacrylate; polymers of vinylphosphonic acids such as vinylphosphonic acid, 2-propene-1-phosphonic acid, 4-vinylbenzylphosphonic acid, and 4-vinylphenylphosphonic acid; polymers of vinylphosphinic acids such as vinylphosphinic acid and 4-vinylbenzylphosphinic acid; and phosphorylated starch. The polymer (Aa) may be a homopolymer of a monomer having the at least one phosphorus atom-containing functional group or may be a copolymer of two or more monomers. Alternatively, a mixture of two or more polymers each consisting of a single monomer may be used as the polymer (Aa). In particular, a polymer of a phosphono (meth)acrylic acid ester and/or a polymer of a vinylphosphonic acid is preferred, and a polymer of a vinylphosphonic acid is more preferred. That is, a preferred example of the polymer (Aa) is poly(vinylphosphonic acid). The polymer (Aa) can be obtained also by homopolymerization or copolymerization of a vinylphosphonic acid derivative such as a vinylphosphonic acid halide or vinylphosphonic acid ester, followed by hydrolysis.

Alternatively, the polymer (Aa) may be a copolymer of a monomer having the at least one phosphorus atom-containing functional group and another vinyl monomer. Examples of the other vinyl monomer copolymerizable with the monomer having the phosphorus atom-containing functional group include (meth)acrylic acid, (meth)acrylic acid esters, acrylonitrile, methacrylonitrile, styrene, nuclear-substituted styrenes, alkyl vinyl ethers, alkyl vinyl esters, perfluoroalkyl vinyl ethers, perfluoroalkyl vinyl esters, maleic acid, maleic anhydride, fumaric acid, itaconic acid, maleimide, and phenylmaleimide. Among these, (meth)acrylic acid esters, acrylonitrile, styrene, maleimide, and phenylmaleimide are preferred.

In order to obtain a multilayer structure that has better bending resistance, the proportion of the structural units derived from the monomer having the phosphorus atom-containing functional group in the total structural units of the polymer (Aa) is preferably 10 mol % or more, more preferably 20 mol % or more, even more preferably 40 mol % or more, and particularly preferably 70 mol % or more, and may be 100 mol %.

The molecular weight of the polymer (Aa) is not particularly limited. It is preferable that the number average molecular weight be in the range of 1,000 to 100,000. When the number average molecular weight is in this range, both a high level of improving effect of stacking of the layer (Y) on bending resistance and a high level of viscosity stability of the coating liquid (S) described later can be achieved. When the layer (Z) described later is stacked, the improving effect on bending resistance is further enhanced by using the polymer (Aa) whose molecular weight per phosphorus atom is in the range of 100 to 500.

[Polymer (B)]

Examples of the polymer (B) having a hydroxy group and/or carboxyl group include: polyvinyl alcohol-based polymers such as polyvinyl alcohol, modified polyvinyl alcohol containing 1 to 50 mol % of α-olefin units having 4 or less carbon atoms, and polyvinyl acetal (e.g., polyvinyl butyral); polysaccharides such as cellulose and starch; (meth)acrylic polymers such as polyhydroxyethyl (meth) acrylate, poly(meth)acrylic acid, and ethylene-(meth)acrylic acid copolymer; and maleic polymers such as a hydrolysate of ethylene-maleic anhydride copolymer, a hydrolysate of styrene-maleic anhydride copolymer, and a hydrolysate of isobutylene-maleic anhydride alternating copolymer. Among these, the polyvinyl alcohol-based polymers are preferred. More specifically, polyvinyl alcohol and modified polyvinyl alcohol containing 1 to 15 mol % of α-olefin units having 4 or less carbon atoms are preferred.

The polymer (B) may be a homopolymer of a monomer having a hydroxy group and/or a carboxyl group (e.g., acrylic acid) or a monomer capable of forming a hydroxy group and/or carboxyl group by further reaction (e.g., hydrolysis reaction) after polymerization (e.g., vinyl acetate or acrylic acid ester), may be a copolymer of two or more monomers, or may be a copolymer of a monomer having a hydroxy group and/or carboxyl group and a monomer having none of these groups. A mixture of two or more polymers (B) may be used as the polymer (B).

The molecular weight of the polymer (B) is not particularly limited. In order to obtain a multilayer structure that has better gas barrier properties and mechanical properties (e.g., drop impact resistance), the number average molecular weight of the polymer (B) is preferably 5,000 or more, more preferably 8,000 or more, and even more preferably 10,000 or more. The upper limit of the number average molecular weight of the polymer (B) is not particularly defined, and is, for example, 1,500,000 or less.

The layer (Y) included in the multilayer structure of the present invention may consist only of the compound (A), may consist only of the compound (A) and the polymer (B), or may further contain an additional component. Examples of the additional component include: metal salts of inorganic acids such as a metal carbonate, a metal hydrochloride, a metal nitrate, a metal hydrogen carbonate, a metal sulfate, a metal hydrogen sulfate, and a metal borate; metal salts of organic acids such as a metal oxalate, a metal acetate, a metal tartrate, and a metal stearate; metal complexes such as a cyclopentadienyl metal complex (e.g., titanocene) and a cyanometal complex; layered clay compounds; crosslinking agents; polymer compounds other than the polymer (Aa) and polymer (B); plasticizers; antioxidants; ultraviolet absorbers; and flame retardants. The content of the additional component in the layer (Y) of the multilayer structure is preferably 50 mass % or less, more preferably 20 mass % or less, even more preferably 10 mass % or less, and particularly preferably 5 mass % or less, and may be 0 mass % (which means that the additional component is not contained). The layer (Y) is free of aluminum atoms which are contained in the layer (Z). In other words, the layer (Y) differs from the layer (Z) by being substantially free of aluminum atoms which are contained in the layer (Z).

In terms of allowing the multilayer structure to maintain good appearance, the content of the polymer (B) in the layer (Y) is preferably 85 mass % or less, more preferably 50 mass % or less, even more preferably 20 mass % or less, and particularly preferably 10 mass % or less, with respect to the mass of the layer (Y) (defined as 100 mass %). The polymer (B) may or may not react with another component in the layer (Y).

It is preferable for the thickness of one layer (Y) to be 0.003 μm or more, in terms of better bending resistance of the multilayer structure of the present invention. The upper limit of the thickness of the layer (Y) is not particularly defined; however, the improving effect on bending resistance reaches a plateau when the thickness of the layer (Y) exceeds 1.0 μm. Hence, it is preferable to set the upper limit of the (total) thickness of the layer(s) (Y) to 1.0 μm for economical reasons. The thickness of the layer (Y) can be controlled depending on the concentration of the later-described coating liquid (S) used for forming the layer (Y) or the method for applying the liquid (S).

[Layer (Z)]

The layered product of the present invention includes the layer (Z) containing aluminum atoms. It is preferable that the layer (Y) and the layer (Z) be stacked contiguous to (in contact with) each other. In other words, it is preferable that in the layered product of the present invention, at least one pair of the layer (Z) and layer (Y) be disposed contiguous to each other. It is preferable that the layer (Z) be disposed between the base (X) and the layer (Y) and be disposed contiguous to the layer (Y). In a preferred example of this case, the layer (Y) is located on the surface of the layered product, and the layer (H) is stacked on the layer (Y) directly or with the adhesive layer (L) interposed therebetween.

The layer (Z) may be a layer (Z1) containing a reaction product (E) formed by a reaction between a metal oxide (C) containing an aluminum atom and a phosphorus compound (D). A compound formed by a reaction among the metal oxide (C), the phosphorus compound (D), and still another compound is also classified as the reaction product (E) herein. The layer (Z) may be a layer (Z2) that is a deposited layer of aluminum. The layer (Z) may be a deposited layer of a compound containing an aluminum atom, or a layer (Z3) that is a deposited layer of aluminum oxide.

[Layer (Z1)]

Examples of the structure of the reaction product (E) contained in the layer (Z1) include a structure in which particles of the metal oxide (C) are bonded together via phosphorus atoms derived from the phosphorus compound (D). The forms in which the particles are bonded via phosphorus atoms include a form in which the particles are bonded via atomic groups containing a phosphorus atom, and examples of such a form include a form in which the particles are bonded via atomic groups containing a phosphorus atom and containing no metal atom. The layer (Z1) may partially contain the metal oxide (C) and/or phosphorus compound (D) that remains uninvolved in any reaction.

In the layer (Z1), the molar ratio between the metal atoms constituting the metal oxide (C) and the phosphorus atoms derived from the phosphorus compound (D), as expressed by [Metal atoms constituting metal oxide (C)]:[Phosphorus atoms derived from phosphorus compound (D)], is preferably in the range of 1.0:1.0 to 3.6:1.0, and more preferably in the range of 1.1:1.0 to 3.0:1.0. If the molar ratio falls outside such a range, the gas barrier properties deteriorate. The molar ratio in the layer (Z1) can be adjusted depending on the mixing ratio between the metal oxide (C) and the phosphorus compound (D) in a coating liquid for forming the layer (Z1). The molar ratio in the layer (Z1) is typically equal to that in the coating liquid.

In an infrared absorption spectrum of the layer (Z1), a maximum absorption wavenumber in the region of 800 to 1,400 $cm^{-1}$ is preferably 1,080 to 1,130 $cm^{-1}$. In the process in which the metal oxide (C) and the phosphorus compound (D) react to form the reaction product (E), a metal atom (M) derived from the metal oxide (C) and a phosphorus atom (P) derived from the phosphorus compound (D) are linked via an oxygen atom (O) to form a bond represented by M-O-P. As a result, a characteristic absorption band attributed to this bond appears in an infrared absorption spectrum of the reaction product (E). A study by the present inventors has revealed that the resulting layered product exhibits good gas barrier properties when the characteristic absorption band attributed to the M-O-P bond is observed in the region of 1,080 to 1,130 $cm^{-1}$. It has been found that the resulting layered product exhibits much better gas barrier properties particularly when the characteristic absorption band corresponds to the strongest absorption in the region of 800 to 1,400 $cm^{-1}$ where absorptions attributed to bonds between various atoms and oxygen atoms are generally observed.

By contrast, if a metal compound such as a metal alkoxide or metal salt and the phosphorus compound (D) are first mixed together and the mixture is then subjected to hydrolytic condensation, the resulting product is a composite material in which the metal atoms derived from the metal compound and the phosphorus atoms derived from the phosphorus compound (D) have been almost homogeneously mixed and reacted. In this case, in an infrared absorption spectrum of the composite material, the maximum absorption wavenumber in the region of 800 to 1,400 $cm^{-1}$ falls outside the range of 1,080 to 1,130 $cm^{-1}$.

In the infrared absorption spectrum of the layer (Z1), the half width of the maximum absorption band in the region of 800 to 1,400 $cm^{-1}$ is preferably 200 $cm^{-1}$ or less, more preferably 150 $cm^{-1}$ or less, even more preferably 100 $cm^{-1}$ or less, and particularly preferably 50 $cm^{-1}$ or less, in terms of the gas barrier properties of the resulting layered product.

The infrared absorption spectrum of the layer (Z1) can be measured by the method described below in "EXAMPLES". If the measurement is not possible by the method described in "EXAMPLES", the measurement may be conducted by another method, examples of which include, but are not limited to: reflection spectroscopy such as reflection absorption spectroscopy, external reflection spectroscopy, or attenuated total reflection spectroscopy; and transmission spectroscopy such as Nujol method or pellet method performed on the layer (Z1) scraped from the layered product.

The layer (Z1) has a structure in which particles of the metal oxide (C) are bonded together via phosphorus atoms derived from the phosphorus compound (D) and not via metal atoms other than those derived from the metal oxide (C). That is, the layer (Z1) has a structure in which the particles of the metal oxide (C) may be bonded together via metal atoms derived form the metal oxide (C) but are not bonded via other metal atoms. The "structure in which particles of the metal oxide (C) are bonded together via phosphorus atoms derived from the phosphorus compound (D) and not via metal atoms other than those derived from the metal oxide (C)" as defined herein refers to a structure in which the main chain of the bond between the bonded particles of the metal oxide (C) has a phosphorus atom derived from the phosphorus compound (D) and does not have any metal atoms other than those derived from the metal oxide (C), and embraces a structure in which the side chain of the bond has a metal atom. It should be noted that the layer (Z1) may partially have a structure in which the particles of the metal oxide (C) are bonded together via both phosphorus atoms derived from the phosphorus compound (D) and metal atoms (structure in which the main chain of the bond between the bonded particles of the metal oxide (C) has both a phosphorus atom derived from the phosphorus compound (D) and a metal atom).

In the layer (Z1), the number of moles of metal atoms binding the particles of the metal oxide (C) together and being different from those derived from the metal oxide (C) is preferably in the range of 0 to 1 times (e.g., 0 to 0.9 times) the number of moles of phosphorus atoms binding the particles of the metal oxide (C) together.

Examples of the form of bonding between each particle of the metal oxide (C) and a phosphorus atom in the layer (Z1) include a form in which the metal atom (M) constituting the metal oxide (C) and the phosphorus atom (P) are bonded via the oxygen atom (O). The particles of the metal oxide (C) may be bonded together via the phosphorus atom (P) derived from one molecule of the phosphorus compound (D) or may be bonded together via the phosphorus atoms (P) derived from two or more molecules of the phosphorus compound (D). Specific examples of the form of bonding between two bonded particles of the metal oxide (C) include a bonding form represented by (Mα)-O-P-O-(Mβ), a bonding form represented by (Mα)-O-P-[O-P]$_n$-O-(Mβ), a bonding form represented by (Mα)-O-P-E-P-O-(Mβ), and a bonding form represented by (Mα)-O-P-E-P-[O-P-E-P]$_n$-O-(Mβ), where (Mα) denotes a metal atom constituting one of the bonded particles of the metal oxide (C) and (Mβ) denotes a metal atom constituting the other of the particles of the metal oxide (C). In the examples of the bonding form, n represents an integer of 1 or more, E represents a constituent atomic group present between two phosphorus atoms when the phosphorus compound (D) has two or more phosphorus atoms per molecule, and the other substituents bonded to the phosphorus atoms are omitted.

In the layer (Z1), it is preferable that one particle of the metal oxide (C) be bonded to two or more other particles of the metal oxide (C), in terms of the gas barrier properties of the resulting layered product.

The metal oxide (C) may be a hydrolytic condensate of a compound (G) containing the metal atom (M) to which a hydrolyzable characteristic group is bonded. Examples of the characteristic group include $R^1$ in the general formula (I) described later. The hydrolytic condensate of the compound (G) can be regarded substantially as a metal oxide. Thus, the hydrolytic condensate of the compound (G) may be referred to as "metal oxide (C)" herein. That is, the term "metal oxide (C)" as used herein is interchangeable with the term "hydrolytic condensate of the compound (G)", while the term "hydrolytic condensate of the compound (G)" as used herein is interchangeable with the term "metal oxide (C)".

The thickness of the layer (Z1) (or, for a layered product including two or more layers (Z1), the total thickness of the layers (Z1)) is preferably in the range of 0.05 μm to 4.0 μm, and more preferably in the range of 0.1 μm to 2.0 μm. Thinning the layer (Z1) provides a reduction in the dimensional change that the layered product can undergo during a process such as printing or lamination. Thinning the layer (Z1) also provides an increase in the flexibility of the layered product, thus making it possible to allow the layered product to have mechanical characteristics close to mechanical characteristics intrinsic to the base. When the layered product of the present invention has two or more layers (Z1), it is preferable for the thickness of each layer (Z1) to be preferably 0.05 μm or more, in terms of the gas barrier properties. The thickness of the layer (Z1) can be controlled depending on the concentration of the later-described coating liquid (T) used for forming the layer (Z1) or the method for applying the liquid (T).

The thickness of the layer (Z1) can be measured by observing a cross-section of the layered product or the multilayer structure with a scanning electron microscope or transmission electron microscope. The thicknesses of the layer (Y) and other layers can be measured in the same manner.

[Metal Oxide (C)]

The metal atoms constituting the metal oxide (C) (the metal atoms may be collectively referred to as "metal atoms (M)") include at least one metal atom selected from atoms of metals belonging to Groups 2 to 14 of the periodic table, and include at least aluminum atoms. The metal atoms (M) may consist of aluminum atoms alone or may include aluminum atoms and other metal atoms. A mixture of two or more metal oxides (C) may be used as the metal oxide (C).

The proportion of aluminum atoms in the metal atoms (M) is typically 50 mol % or more, and may be in the range of 60 mol % to 100 mol % or in the range of 80 mol % to 100 mol %. Examples of the metal oxide (C) include metal oxides produced by methods such as liquid-phase synthesis, gas-phase synthesis, and solid grinding.

[Compound (G)]

In terms of ease of control of the reaction and in terms of good gas barrier properties of the resulting multilayer structure, the compound (G) preferably includes at least one compound (G1) represented by the following general formula [I].

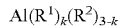
$$Al(R^1)_k(R^2)_{3-k} \qquad [I]$$

In the formula, $R^1$ is a halogen atom (fluorine atom, chlorine atom, bromine atom, or iodine atom), $NO_3$, an optionally substituted alkoxy group having 1 to 9 carbon atoms, an optionally substituted acyloxy group having 2 to 9 carbon atoms, an optionally substituted alkenyloxy group having 3 to 9 carbon atoms, an optionally substituted β-diketonato group having 5 to 15 carbon atoms, or a diacylmethyl group having an optionally substituted acyl group having 1 to 9 carbon atoms. $R^2$ is an optionally substituted alkyl group having 1 to 9 carbon atoms, an optionally substituted aralkyl group having 7 to 10 carbon atoms, an optionally substituted alkenyl group having 2 to 9 carbon atoms, or an optionally substituted aryl group having 6 to 10 carbon atoms. k is an integer of 1 to 3. When there are two or more atoms or groups represented by $R^1$, the atoms or groups represented by $R^1$ may be the same as or different from each other. When there are two or more atoms or groups represented by $R^2$, the atoms or groups represented by $R^2$ may be the same as or different from each other.

The compound (G) may include, in addition to the compound (G1), at least one compound (G2) represented by the following general formula [II].

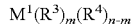
$$M^1(R^3)_m(R^4)_{n-m} \qquad [II]$$

In the formula, $M^1$ is at least one metal atom different from an aluminum atom and selected from atoms of metals belonging to Groups 2 to 14 of the periodic table. $R^3$ is a halogen atom (fluorine atom, chlorine atom, bromine atom, or iodine atom), $NO_3$, an optionally substituted alkoxy group having 1 to 9 carbon atoms, an optionally substituted acyloxy group having 2 to 9 carbon atoms, an optionally substituted alkenyloxy group having 3 to 9 carbon atoms, an optionally substituted β-diketonato group having 5 to 15 carbon atoms, or a diacylmethyl group having an optionally substituted acyl group having 1 to 9 carbon atoms. $R^4$ is an optionally substituted alkyl group having 1 to 9 carbon atoms, an optionally substituted aralkyl group having 7 to 10 carbon atoms, an optionally substituted alkenyl group having 2 to 9 carbon atoms, or an optionally substituted aryl group having 6 to 10 carbon atoms. m is an integer of 1 to n. n is equal to the valence of $M^1$. When there are two or more atoms or groups represented by $R^3$, the atoms or groups represented by $R^3$ may be the same as or different from each other. When there are two or more atoms or groups represented by $R^4$, the atoms or groups represented by $R^4$ may be the same as or different from each other.

Examples of the alkoxy groups represented by $R^1$ and $R^3$ include methoxy, ethoxy, n-propoxy, isopropoxy, n-butoxy, isobutoxy, sec-butoxy, tert-butoxy, benzyloxy, diphenylmethoxy, trityloxy, 4-methoxybenzyloxy, methoxymethoxy, 1-ethoxyethoxy, benzyloxymethoxy, 2-trimethylsilylethoxy, 2-trimethylsilylethoxymethoxy, phenoxy, and 4-methoxyphenoxy groups.

Examples of the acyloxy groups represented by $R^1$ and $R^3$ include acetoxy, ethylcarbonyloxy, n-propylcarbonyloxy, isopropylcarbonyloxy, n-butylcarbonyloxy, isobutylcarbonyloxy, sec-butylcarbonyloxy, tert-butylcarbonyloxy, and n-octylcarbonyloxy groups.

Examples of the alkenyloxy groups represented by $R^1$ and $R^3$ include allyloxy, 2-propenyloxy, 2-butenyloxy, 1-methyl-2-propenyloxy, 3-butenyloxy, 2-methyl-2-propenyloxy, 2-pentenyloxy, 3-pentenyloxy, 4-pentenyloxy, 1-methyl-3-butenyloxy, 1,2-dimethyl-2-propenyloxy, 1,1-dimethyl-2-propenyloxy, 2-methyl-2-butenyloxy, 3-methyl-2-butenyloxy, 2-methyl-3-butenyloxy, 3-methyl-3-butenyloxy, 1-vinyl-2-propenyloxy, and 5-hexenyloxy groups.

Examples of the β-diketonato groups represented by $R^1$ and $R^3$ include 2,4-pentanedionato, 1,1,1-trifluoro-2,4-pentanedionato, 1,1,1,5,5,5-hexafluoro-2,4-pentanedionato, 2,2,6,6-tetramethyl-3,5-heptanedionato, 1,3-butanedionato, 2-methyl-1,3-butanedionato, 2-methyl-1,3-butanedionato, and benzoylacetonato groups.

Examples of the acyl groups of the diacylmethyl groups represented by $R^1$ and $R^3$ include aliphatic acyl groups having 1 to 6 carbon atoms such as formyl, acetyl, propionyl (propanoyl), butyryl (butanoyl), valeryl (pentanoyl), and hexanoyl groups; and aromatic acyl (aroyl) groups such as benzoyl and toluoyl groups.

Examples of the alkyl groups represented by $R^2$ and $R^4$ include methyl, ethyl, n-propyl, isopropyl, n-butyl, isobutyl, sec-butyl, tert-butyl, n-pentyl, isopentyl, n-hexyl, isohexyl, 3-methylpentyl, 2-methylpentyl, 1,2-dimethylbutyl, cyclopropyl, cyclopentyl, and cyclohexyl groups.

Examples of the aralkyl groups represented by $R^2$ and $R^4$ include benzyl and phenylethyl (phenethyl) groups.

Examples of the alkenyl groups represented by $R^2$ and $R^4$ include vinyl, 1-propenyl, 2-propenyl, isopropenyl, 3-butenyl, 2-butenyl, 1-butenyl, 1-methyl-2-propenyl, 1-methyl-1-propenyl, 1-ethyl-1-ethenyl, 2-methyl-2-propenyl, 2-methyl-1-propenyl, 3-methyl-2-butenyl, and 4-pentenyl groups.

Examples of the aryl groups represented by $R^2$ and $R^4$ include phenyl, 1-naphthyl, and 2-naphthyl groups.

Examples of the substituents in $R^1$, $R^2$, $R^3$, and $R^4$ include: alkyl groups having 1 to 6 carbon atoms; alkoxy groups having 1 to 6 carbon atoms such as methoxy, ethoxy, n-propoxy, isopropoxy, n-butoxy, isobutoxy, sec-butoxy, tert-butoxy, n-pentyloxy, isopentyloxy, n-hexyloxy, cyclopropyloxy, cyclobutyloxy, cyclopentyloxy, and cyclohexyloxy groups; alkoxycarbonyl groups having 1 to 6 carbon atoms such as methoxycarbonyl, ethoxycarbonyl, n-propoxycarbonyl, isopropoxycarbonyl, n-butoxycarbonyl, isobutoxycarbonyl, sec-butoxycarbonyl, tert-butoxycarbonyl, n-pentyloxycarbonyl, isopentyloxycarbonyl, cyclopropyloxycarbonyl, cyclobutyloxycarbonyl, and cyclopentyloxycarbonyl groups; aromatic hydrocarbon groups such as phenyl, tolyl, and naphthyl groups; halogen atoms such as fluorine, chlorine, bromine, and iodine atoms; acyl groups having 1 to 6 carbon atoms; aralkyl groups having 7 to 10 carbon atoms; aralkyloxy groups having 7 to 10 carbon atoms; alkylamino groups having 1 to 6 carbon atoms; and dialkylamino groups having an alkyl group having 1 to 6 carbon atoms.

It is preferable for $R^1$ to be a halogen atom, $NO_3$, an optionally substituted alkoxy group having 1 to 6 carbon atoms, an optionally substituted acyloxy group having 2 to 6 carbon atoms, an optionally substituted β-diketonato group having 5 to 10 carbon atoms, or a diacylmethyl group having an optionally substituted acyl group having 1 to 6 carbon atoms.

It is preferable for $R^2$ to be an optionally substituted alkyl group having 1 to 6 carbon atoms. In the formula [I], k is preferably 3.

It is preferable for $R^3$ to be a halogen atom, $NO_3$, an optionally substituted alkoxy group having 1 to 6 carbon atoms, an optionally substituted acyloxy group having 2 to 6 carbon atoms, an optionally substituted β-diketonato group having 5 to 10 carbon atoms, or a diacylmethyl group having an optionally substituted acyl group having 1 to 6 carbon atoms.

It is preferable for $R^4$ to be an optionally substituted alkyl group having 1 to 6 carbon atoms. It is preferable for $M^1$ to be an atom of a metal belonging to Group 4 of the periodic table, and more preferably a titanium or zirconium atom. When is an atom of a metal belonging to Group 4 of the periodic table, m in the formula [II] is preferably 4.

Boron and silicon are categorized as metals herein, although they may be classified as semimetals in other contexts.

Examples of the compound (G1) include aluminum chloride, aluminum nitrate, aluminum acetate, tris(2,4-pentanedionato)aluminum, trimethoxyaluminum, triethoxyaluminum, tri-n-propoxyaluminum, triisopropoxyaluminum, tri-n-butoxyaluminum, tri-sec-butoxyaluminum, and tri-tert-butoxyaluminum. Among these, triisopropoxyaluminum and tri-sec-butoxyaluminum are more preferred. A mixture of two or more compounds (G1) may be used as the compound (G).

Examples of the compound (G2) include: titanium compounds such as tetrakis(2,4-pentanedionato)titanium, tetramethoxytitanium, tetraethoxytitanium, tetraisopropoxytitanium, tetra-n-butoxytitanium, and tetrakis(2-ethylhexoxy)titanium; and zirconium compounds such as tetrakis(2,4-pentanedionato)zirconium, tetra-n-propoxyzirconium, and tetra-n-butoxyzirconium. These may be used alone or two or more compounds (G2) may be used in combination.

The proportion of the compound (G1) in the total amount of the compound (G) is not particularly limited as long as the effect of the present invention is obtained. The proportion of the compound (e.g., the compound (G2)) other than the compound (G1) in the total amount of the compound (G) is preferably 20 mol % or less, more preferably 10 mol % or less, and even more preferably 5 mol % or less, and may be 0 mol %, for example.

The compound (G) is hydrolyzed, so that at least some of the hydrolyzable characteristic groups of the compound (G) are converted to hydroxy groups. The hydrolysate is then condensed to form a compound in which the metal atoms (M) are linked together via an oxygen atom (O). The repetition of this condensation results in the formation of a compound that can be substantially regarded as a metal oxide. In general, the thus formed metal oxide (C) has hydroxy groups present on its surface.

A compound is categorized as the metal oxide (C) herein when the ratio, [the number of moles of the oxygen atoms (O) bonded only to the metal atoms (M)]/[the number of moles of the metal atoms (M)], is 0.8 or more in the compound. The "oxygen atom (O) bonded only to the metal atom (M)", as defined herein, refers to the oxygen atom (O) in the structure represented by M-O-M, and does not include an oxygen atom that is bonded to both the metal atom (M) and hydrogen atom (H) as is the case for the oxygen atom (O) in the structure represented by M-O-H. The above ratio in the metal oxide (C) is preferably 0.9 or more, more preferably 1.0 or more, and even more preferably 1.1 or more. The upper limit of this ratio is not particularly defined. When the valence of the metal atom (M) is denoted by n, the upper limit is typically expressed as n/2.

In order for the hydrolytic condensation to take place, it is important that the compound (G) has hydrolyzable characteristic groups. When there are no such groups bonded, hydrolytic condensation reaction does not occur or proceeds very slowly, which makes difficult the preparation of the metal oxide (C) intended.

The hydrolytic condensate of the compound (G) may be produced, for example, from a particular raw material by a technique employed in commonly-known sol-gel processes. As the raw material there can be used at least one selected from the group consisting of the compound (G), a partial hydrolysate of the compound (G), a complete hydrolysate of the compound (G), a compound formed by partial hydrolytic condensation of the compound (G), and a compound formed by condensation of a part of a complete hydrolysate of the compound (G).

The metal oxide (C) to be mixed with the phosphorus compound (D)-containing material (the phosphorus compound (D) itself or a composition containing the phosphorus compound (D)) is preferably substantially free of phosphorus atoms.

The layer (Z1) has a particular structure in which the particles of the metal oxide (C) are bonded together via phosphorus atoms derived from the phosphorus compound (D). The shape and size of the particles of the metal oxide (C) contained in the layer (Z1) and the shape and size of the particles of the metal oxide (C) to be mixed with the phosphorus compound (D)-containing material (the phosphorus compound (D) itself or a composition containing the phosphorus compound (D)) may be the same or different. That is, the particles of the metal oxide (C) used as a raw material of the layer (Z1) may change in shape or size during the process of formation of the layer (Z1).

[Phosphorus Compound (D)]

The phosphorus compound (D) has a moiety capable of reacting with the metal oxide (C) and typically has two or more such moieties. In a preferred example, the phosphorus compound (D) contains 2 to 20 such moieties (atomic groups or functional groups). Examples of such moieties include a moiety capable of reacting with a functional group (e.g., hydroxy group) present on the surface of the metal oxide (C). Examples of such a moiety include a halogen atom bonded directly to a phosphorus atom and an oxygen atom bonded directly to a phosphorus atom. Such a halogen atom or oxygen atom is capable of undergoing condensation reaction (hydrolytic condensation reaction) with a hydroxy group present on the surface of the metal oxide (C). In general, the functional group (e.g., hydroxy group) present on the surface of the metal oxide (C) is bonded to the metal atom (M) constituting the metal oxide (C).

The phosphorus compound (D) used may be one that has a structure in which a halogen atom or oxygen atom is bonded directly to a phosphorus atom. Such a phosphorus compound (D) is capable of forming bonds with hydroxy groups present on the surface of the metal oxide (C) through (hydrolytic) condensation. The phosphorus compound (D) may have one phosphorus atom or may have two or more phosphorus atoms.

The phosphorus compound (D) may be at least one selected from the group consisting of: phosphorus oxoacids such as phosphoric acid, diphosphoric acid, triphosphoric acid, polyphosphoric acid formed by condensation of 4 or more molecules of phosphoric acid, phosphorous acid, phosphonic acid, phosphonous acid, phosphinic acid, and phosphinous acid; salts of these oxoacids (e.g., sodium phosphate); and derivatives of these oxoacids (e.g., halides such as phosphoryl chloride and dehydration products such as phosphorus pentoxide).

One of these phosphorus compounds (D) may be used alone or two or more thereof may be used in combination. Among the above examples of the phosphorus compound (D), phosphoric acid is preferably used alone or in combination with another phosphorus compound (D). The use of phosphoric acid improves the stability of the coating liquid (T) described later and the gas barrier properties of the resulting layered product.

The layer (Z1) may contain a particular polymer (F). The polymer (F) may be a polymer having at least one functional group selected from the group consisting of a hydroxy group, a carboxyl group, a carboxylic anhydride group, and a salt of a carboxyl group. For example, the polymer (F) may be any of the polymers mentioned as examples of the polymer (B). The layer (Z1) may further contain an additional component other than the polymer (F). Examples of the additional component include the substances mentioned as examples of the additional component that may be contained in the layer (Y). The content of the additional component in the layer (Z1) is preferably 50 mass % or less, more preferably 20 mass % or less, even more preferably 10 mass % or less, and particularly preferably 5 mass % or less.

[Inorganic Deposited Layer: Layer (Z2) and Layer (Z3)]

The layered product may include an inorganic deposited layer. The inorganic deposited layer can be formed by vapor deposition of an inorganic substance. Examples of the inorganic substance include metals (such as aluminum), metal oxides (such as silicon oxide and aluminum oxide), metal nitrides (such as silicon nitride), metal oxynitrides (such as silicon oxynitride), and metal carbonitrides (such as silicon carbonitride). Among these, aluminum oxide, silicon oxide, magnesium oxide, and silicon nitride are preferred in that an inorganic deposited layer formed of any of these substances has good barrier properties against oxygen and water vapor. The layer (Z) in the layered product of the present invention may be an inorganic deposited layer containing aluminum. For example, the layer (Z) may include a layer (Z2) that is a deposited layer of aluminum and/or a layer (Z3) that is a deposited layer of aluminum oxide. In an example, the layer (Z) is the layer (Z2) or layer (Z3).

The method for forming the inorganic deposited layer is not particularly limited, and available methods include: physical vapor deposition processes such as vacuum vapor deposition (e.g., resistive heating vapor deposition, electron beam vapor deposition, and molecular beam epitaxy), sputtering, and ion plating; and chemical vapor deposition processes such as thermal chemical vapor deposition (e.g., catalytic chemical vapor deposition), photochemical vapor deposition, plasma chemical vapor deposition (e.g., capacitively coupled plasma process, inductively coupled plasma process, surface wave plasma process, electron cyclotron resonance plasma process, and dual magnetron process), atomic layer deposition, and organometallic vapor deposition. The thickness of the inorganic deposited layer is preferably in the range of 0.002 to 0.5 µm, although the specific preferred thickness depends on the type of the component of the inorganic deposited layer. A thickness at which good barrier properties and mechanical properties of the layered product are achieved can be selected within the above range. If the thickness of the inorganic deposited layer is less than 0.002 µm, the inorganic deposited layer tends to have a low ability to repeatedly exhibit the barrier properties against oxygen and water vapor, and the inorganic deposited layer may fail to exhibit sufficient barrier properties. If the thickness of the inorganic deposited layer is more than 0.5 µm, the barrier properties of the inorganic deposited layer are likely to deteriorate when the layered product is pulled or bent. The thickness of the inorganic deposited layer is more preferably in the range of 0.005 to 0.2 µm, and even more preferably in the range of 0.01 to 0.1 µm.

[Method for Producing Layered Product]

An example of the method for producing the layered product of the present invention will be hereinafter described. The features described for the layered product of the present invention can be applied to the following production method and may not be described repeatedly. The features described for the following production method can be applied to the layered product of the present invention.

This production method is a method for producing a layered product including a base (X), a layer (Z), and a layer (Y). This production method includes a layer (Y) formation step and a layer (Z) formation step. The layer (Y) formation step includes: a step (Y-i) of preparing a coating liquid (S) containing a compound (A) and a solvent; and a step (Y-ii) of forming the layer (Y) on the base (X) using the coating liquid (S). The layer (Z) formation step will be described later. The coating liquid (S) may contain a polymer (B). In the case where the coating liquid (S) contains the polymer (B), it is preferable that the compound (A) and the polymer (B) be mixed at a mass ratio of 15:85 to 99:1 in the step (Y-i). This results in the formation of the layer (Y) containing the compound (A) and polymer (B) mixed at this ratio. The compound (A), the polymer (B), and the mass ratio therebetween are as previously described, and will not be described repeatedly.

[Coating Liquid (S)]

The solvent used in the coating liquid (S) can be optionally selected depending on the types of the compound (A) (and optionally the polymer (B)). The solvent is preferably water, an alcohol, or a mixed solvent thereof. The solvent may contain any of the following substances as long as the dissolution of the compound (A) (and the polymer (B)) is not hindered: ethers such as tetrahydrofuran, dioxane, trioxane, and dimethoxyethane; ketones such as acetone and methyl ethyl ketone; glycols such as ethylene glycol and propylene glycol; glycol derivatives such as methyl cellosolve, ethyl cellosolve, and n-butyl cellosolve; glycerin; acetonitrile; amides such as dimethylformamide; dimethyl sulfoxide; and sulfolane.

In terms of the storage stability of the coating liquid (S) and the gas barrier properties of the layered product, the pH of the coating liquid (S) is preferably in the range of 0.1 to 6.0, more preferably in the range of 0.2 to 5.0, and even more preferably in the range of 0.5 to 4.0. The pH of the coating liquid (S) can be adjusted by a commonly-known method. For example, the pH can be adjusted by adding an acidic or basic compound to the coating liquid (S).

In the step (Y-ii), the layer (Y) is formed typically by applying the coating liquid (S) and then removing the solvent. The method for applying the coating liquid (S) is not particularly limited, and any commonly-known method can be employed. Examples of the application method include casting, dipping, roll coating, gravure coating, screen printing, reverse coating, spray coating, kiss coating, die coating, metering bar coating, chamber doctor-using coating, curtain coating, and bar coating.

The method for removing the solvent from the coating liquid (S) is not particularly limited, and any commonly-known drying method can be employed.

Examples of the drying method include hot air drying, hot roll contact drying, infrared heating, and microwave heating. The drying temperature is preferably 0 to 15° C. or more lower than the onset temperature of fluidization of the base (X).

[Layer (Z) Formation Step]

The production method of a layered product includes a step of forming the layer (Z) containing aluminum atoms on the base (X). The layer (Z) formation step results in the layered product including the layer (Z). Preferably, the layer (Z) and the layer (Y) are formed contiguous to each other.

The layer (Z) formation step may be performed at any time. For example, the layer (Z) formation step may be performed before the step (Y-i), after the step (Y-ii), or at any time between the steps (Y-i) and (Y-ii). It is preferable to perform the layer (Z) formation step before the step (Y-i). When the layer (Y) is to be disposed between the base (X) and the layer (Z), the layer (Z) formation step is performed after the step (Y-ii). When the layer (Z) is to be disposed between the base (X) and the layer (Y), the layer (Z) formation step is performed before the step (Y-ii). In this case, the coating liquid (S) is applied to the layer (Z) in the step (Y-ii).

When the layer (Z) is a layer (Z2) that is a deposited layer of aluminum or a layer (Z3) that is a deposited layer of aluminum oxide, the deposited layer can be formed by any of the common vapor deposition processes mentioned above. Thus, the following will describe the method for forming the layer (Z1) in detail. An example of the method for forming the layer (Z1) is described in JP 2013-208794 A.

When the layer (Z1) is to be formed, the layer (Z) formation step may include the steps (Z-i), (Z-ii), and (Z-iii). In the step (Z-i), a metal oxide (C), a phosphorus compound (D), and a solvent are mixed to prepare a coating liquid (T). In the step (Z-ii), the coating liquid (T) is applied onto the base (X) to form a precursor layer of the layer (Z1) on the base (X). In the step the precursor layer is heat-treated at a temperature of 110° C. or higher to form the layer (Z1) on the base (X). The details of the steps (Z-i) to (Z-iii) will be described below.

The step (Z-i), step (Z-ii), step (Z-iii), and step (Y-ii) are carried out typically in this order. However, when the layer (Y) is to be formed between the base (X) and the layer (Z1), the step (Y-ii) is carried out before the step (Z-ii) (may be carried out before the step (Z-i)). The step (Y-ii) may be carried out between the step (Z-ii) and the step (Z-iii). It is preferable to carry out the step (Y-ii) after the step (Z-iii) to allow the resulting layered product and multilayer structure to have good appearance.

[Step (Z-i)]

In the step (Z-i), the metal oxide (C), the phosphorus compound (D), and a solvent are at least mixed to prepare the coating liquid (T) containing them. From another standpoint, the metal oxide (C) and the phosphorus compound (D) are reacted in the solvent in the step (Z-i). Another compound (e.g., the polymer (F)) may be present with the metal oxide (C), phosphorus compound (D), and solvent when they are mixed.

[Dispersion of Metal Oxide (C)]

When the metal oxide (C) is aluminum oxide, the preparation of a dispersion of aluminum oxide is started by subjecting an aluminum alkoxide to hydrolytic condensation in an aqueous solution whose pH has optionally been adjusted by addition of an acid, thus giving a slurry of aluminum oxide. Next, the slurry is deflocculated in the presence of a certain amount of acid to obtain the dispersion of aluminum oxide. A dispersion of the metal oxide (C) containing an atom of a metal other than aluminum can be produced in the same manner.

Preferred examples of the acid catalyst used in hydrolytic condensation include hydrochloric acid, sulfuric acid, nitric acid, acetic acid, lactic acid, and butyric acid, among which nitric acid and acetic acid are more preferred. When an acid catalyst is used in hydrolytic condensation, it is preferable to use the acid catalyst in an appropriate amount depending on the type of the acid so that the pH falls within the range of 2.0 to 4.0 before the hydrolytic condensation.

The step (Z-i) preferably includes the following steps (Z-i-1) to (Z-i-3).

Step (Z-i-1): Step of preparing a dispersion (J) containing the metal oxide (C).

Step (Z-i-2): Step of preparing a solution (K) containing the phosphorus compound (D).

Step (Z-i-3): Step of mixing the dispersion (J) obtained in the step (Z-i-1) and the solution (K) obtained in the step (Z-i-2).

The step (Z-i-2) may be performed prior to the step (Z-i-1), simultaneously with the step (Z-i-1), or subsequent to the step (Z-i-1).

[Step (Z-i-1)]

In the step (Z-i-1), the dispersion (J) containing the metal oxide (C) is prepared. The dispersion (J) may be a dispersion of the metal oxide (C). The dispersion (J) can be prepared, for example, by mixing the compound (G), water, and optionally an acid catalyst and/or organic solvent and subjecting the compound (G) to condensation or hydrolytic condensation according to procedures employed in commonly-known sol-gel processes. The dispersion of the metal oxide (C) resulting from condensation or hydrolytic condensation of the compound (G) can be used per se as the dispersion (J) containing the metal oxide (C). The dispersion (J) may be subjected to a certain process (such as deflocculation as described above or addition or removal of the solvent for concentration control) as necessary. The solvent used in the step (Z-i-1) is not particularly limited. Preferred are: alcohols such as methanol, ethanol, and isopropanol; water; and mixed solvents thereof. The step (Z-i-1) may further include a step of subjecting at least one compound selected from the compound (G) and a hydrolysate of the compound (G) to condensation (e.g., hydrolytic condensation).

[Step (Z-i-2)]

In the step (Z-i-2), the solution (K) containing the phosphorus compound (D) is prepared. The solution (K) is prepared by dissolving the phosphorus compound (B) in a solvent. When the solubility of the phosphorus compound (D) is low, the dissolution may be promoted by heating or ultrasonication.

The solvent used in the preparation of the solution (K) may be selected as appropriate depending on the type of the phosphorus compound (D), and preferably contains water. The solvent may contain an organic solvent as long as the organic solvent does not hinder the dissolution of the phosphorus compound (D).

[Step (Z-i-3)]

In the step (Z-i-3), the dispersion (J) and the solution (K) are mixed. The coating liquid (T) may contain the polymer (F). The coating liquid (T) may contain at least one acid compound (Q) selected from acetic acid, hydrochloric acid, nitric acid, trifluoroacetic acid, and trichloroacetic acid, as necessary. The solution obtained in the step (Z-i-3) can be used per se as the coating liquid (T). In this case, the solvent contained in the dispersion (J) or in the solution (K) typically serves as the solvent of the coating liquid (T). Alternatively, the solution obtained in the step (Z-i-3) may be subjected to a process such as addition of an organic solvent, adjustment of the pH, or addition of an additive, and the resulting liquid may be used as the coating liquid (T).

The pH of the coating liquid (T) is preferably in the range of 0.1 to 6.0, more preferably in the range of 0.2 to 5.0, and even more preferably in the range of 0.5 to 4.0, in terms of the storage stability of the coating liquid (T) and the gas barrier properties of the layered product. The pH of the coating liquid (T) can be adjusted by a commonly-known method, an example of which is to add an acidic or basic compound to the coating liquid (T).

[Step (Z-ii)]

In the step (Z-ii), the coating liquid (T) is applied onto the base (X) to form a precursor layer of the layer (Z1) on the base (X). The coating liquid (T) may be applied directly onto at least one surface of the base (X) or applied onto the base (X) with another layer interposed therebetween. An adhesive layer (L) may be formed on a surface of the base (X) by treating the surface of the base (X) with a commonly-known anchor coating agent or applying a commonly-known adhesive to the surface of the base (X) before application of the coating liquid (T). The coating liquid (T) may be applied to the layer (Y) formed on the base (X) in the step (Y-ii) to form the precursor layer of the layer (Z1) on the layer (Y).

The viscosity of the coating liquid (T) to be applied in the step (Z-ii) is preferably 3,000 mPa·s or less, and more preferably 2,000 mPa·s or less, as measured with a Brookfield rotational viscometer (SB-type viscometer: rotor No. 3, rotational speed=60 rpm) at a temperature at which the coating liquid (T) is applied. The viscosity of the coating liquid (S) is preferably 50 mPa·s or more, more preferably 100 mPa·s or more, and even more preferably 200 mPa·s or more. Adjusting the viscosity to 3,000 mPa·s or less improves the leveling of the coating liquid (T), thus allowing the resulting multilayer structure to have better appearance. The viscosity of the coating liquid (T) to be applied in the step (Z-ii) can be adjusted by changing the concentration and temperature of the coating liquid (T) and the time and intensity of the stirring performed after mixing in the step (Z-i-3). For example, long-time stirring following the mixing in the step (Z-i-3) may reduce the viscosity. The method for applying the coating liquid (T) onto the base (X) is not particularly limited, and any commonly-known method can be used. Examples of the application method include those which can be used to apply the coating liquid (S) in the step (Y-ii).

In the step (Z-ii), the precursor layer of the layer (Z1) is formed typically by removing the solvent from the coating liquid (T). The method for removing the solvent is not particularly limited, and any commonly-known drying method can be employed. Examples of the drying method include hot air drying, hot roll contact drying, infrared heating, and microwave heating. The drying temperature is preferably 0 to 15° C. or more lower than the onset temperature of fluidization of the base (X).

[Step (Z-iii)]

In the step (Z-iii), the precursor layer (the precursor layer of the layer (Z1)) formed in the step (Z-ii) is heat-treated at a temperature of 110° C. or higher to form the layer (Z1).

In the step (Z-iii), a reaction takes place in which particles of the metal oxide (C) are bonded together via phosphorus atoms (phosphorus atoms derived from the phosphorus compound (D)). From another standpoint, a reaction of formation of the reaction product (E) takes place in the step (Z-iii). In order for the reaction to take place to a sufficient extent, the temperature of the heat treatment is preferably 110° C. or higher, more preferably 140° C. or higher, even more preferably 170° C. or higher, and particularly preferably 190° C. or higher. A lowered temperature of the heat treatment increases the time required to achieve a sufficient degree of reaction, and can cause a reduction in production efficiency. The preferred upper limit of the temperature of the heat treatment depends, for example, on the type of the base (X). For example, when a thermoplastic resin film made of polyamide resin is used as the base (X), the temperature of the heat treatment is preferably 190° C. or lower. When a thermoplastic resin film made of polyester resin is used as the base (X), the temperature of the heat treatment is preferably 220° C. or lower. The heat treatment may be performed, for example, in an air atmosphere, in a nitrogen atmosphere, or in an argon atmosphere.

The length of time of the heat treatment is preferably in the range of 0.1 seconds to 1 hour, more preferably in the range of 1 second to 15 minutes, and even more preferably in the range of 5 to 300 seconds.

The method for producing a layered product may include a step of irradiating the layer (Z1) or the precursor layer of the layer (Z1) with ultraviolet light. The ultraviolet irradiation may be performed at any time after the step (Z-ii) (e.g., after the removal of the solvent from the applied coating liquid (T) is almost completed).

Treatment of a surface of the base (X) with a commonly-known anchor coating agent or application of a commonly-known adhesive onto a surface of the base (X) may be performed before the application of the coating liquid (T) to dispose the adhesive layer (L) between the base (X) and the layer (Z1).

The layered product thus obtained can be used per se as the layered product of the present invention. As described above, another member (e.g., an additional layer) may be adhered to or formed on the layered product obtained as above, and the resulting layered product may be used as the layered product of the present invention. The adhering of the member can be done by a commonly-known method.

[Adhesive Layer (L)]

In the multilayer structure of the present invention, the layer (Y) and/or layer (Z) may be stacked in direct contact with the base (X). Alternatively, the layer (Y) and/or layer (Z) may be stacked on the base (X) with another layer interposed therebetween. For example, the layer (Y) and/or layer (Z) may be stacked on the base (X) with the adhesive layer (L) interposed therebetween. This configuration may achieve enhanced adhesion between the base (X) and the layer (Y) and/or layer (Z). The adhesive layer (L) may be formed from an adhesive resin. The adhesive layer (L) made of an adhesive resin can be formed by treating a surface of the base (X) with a commonly-known anchor coating agent or by applying a commonly-known adhesive to a surface of the base (X). The adhesive is preferably a two-component reactive polyurethane adhesive containing a polyisocyanate component and a polyol component which are to be mixed and reacted. The addition of a small amount of additive such as a commonly-known silane coupling agent to the anchor coating agent or adhesive may further enhance the resulting adhesion. Examples of the silane coupling agent include, but are not limited to, silane coupling agents having a reactive group such as an isocyanate, epoxy, amino, ureido, or mercapto group. Strong adhesion between the base (X) and the layer (Y) and/or layer (Z) via the adhesive layer (L) makes it possible to more effectively prevent deterioration in the gas barrier properties and appearance of the layered product of the present invention when the layered product is subjected to a process such as printing or lamination, and also makes it possible to increase the drop impact resistance of a packaging material including the layered product of the present invention. The thickness of the adhesive layer (L) may be in the range of 0.01 to 10 µm, and may be, for example, in the range of 0.01 to 5 µm, in the range of 0.01 to 1 µm, or in the range of 0.01 to 5.0 µm.

[Additional Layer]

The layered product of the present invention may include an additional layer for imparting various properties such as heat-sealing properties or for improving the barrier properties or mechanical properties. Such a layered product of the present invention can be produced, for example, by stacking the layer (Y) and layer (Z) on the base (X) directly or with the adhesive layer (L) interposed therebetween and then adhering or forming the additional layer on the layer (Y) or (Z) directly or with the adhesive layer (L) interposed therebetween. Examples of the additional layer include, but are not limited to, an ink layer and a polyolefin layer. A preferred example of the layered product has a structure in which at least one set of the base (X), the layer (Y), and the layer (Z) are stacked in the order of "base (X)/layer (Z)/layer (Y)".

The layered product of the present invention may include an ink layer on which a product name or a decorative pattern is to be printed. Such a layered product of the present invention can be produced, for example, by stacking the layer (Y) and layer (Z) on the base (X) directly or with the adhesive layer (L) interposed therebetween and then forming the ink layer directly on the layer (Y) or (Z). Examples of the ink layer include a film resulting from drying of a liquid prepared by dispersing a polyurethane resin containing a pigment (e.g., titanium dioxide) in a solvent. The ink layer may be a film resulting from drying of an ink or electronic circuit-forming resist containing a polyurethane resin free of any pigment or another resin as a main component. Methods that can be used to apply the ink layer onto the layer (Y) include gravure printing and various coating methods using a wire bar, a spin coater, or a the coater. The thickness of the ink layer is preferably in the range of 0.5 to 10.0 µm, and more preferably in the range of 1.0 to 4.0 µm.

The polymer (B) present in the layer (Y) has a hydroxy group and/or carboxyl group with high affinity to the adhesive layer (L) or additional layer (e.g., ink layer) and hence improves the adhesion between the layer (Y) and another layer. This can enable the layered product to maintain interlayer adhesion after retorting and thus can prevent the layered product from suffering from an appearance defect such as delamination.

Placing a polyolefin layer as an outermost layer of the multilayer structure of the present invention can impart heat-sealing properties to the multilayer structure or improve the mechanical characteristics of the multilayer structure. In terms of, for example, the impartation of heat-sealing properties and the improvement in mechanical characteristics, the polyolefin is preferably polypropylene or polyethylene. It is also preferable to stack at least one film selected from the group consisting of a film made of a polyester, a film made of a polyamide, and a film made of a hydroxy group-containing polymer, in order to improve the mechanical characteristics of the multilayer structure. In terms of the improvement in mechanical characteristics, the polyester is preferably polyethylene terephthalate, the polyamide is preferably nylon-6, and the hydroxy group-containing polymer is preferably ethylene-vinyl alcohol copolymer. Between the layers there may be an anchor coat layer or layer made of an adhesive provided as necessary.

A structure made up of the layer (Y) and layer (Z) stacked contiguously may hereinafter be referred to as a "layer (YZ)". The order of arrangement in the layer (YZ) may be either "layer (Y)/layer (Z)" or "layer (Z)/layer (Y)". Furthermore, a multilayer film including the base (X) and the layer (YZ) stacked on the base (X) may hereinafter be referred to as a "multilayer barrier film". This multilayer barrier film also is a type of the layered product of the present invention. The layered product of the present invention may have, for example, a configuration of "multilayer barrier film/ink layer/polyolefin layer", "multilayer barrier film/ink layer/adhesive layer (L)/polyolefin layer", "multilayer barrier film/adhesive layer (L)/polyolefin layer", or "polyolefin layer/adhesive layer (L)/multilayer barrier film/adhesive layer (L)/polyolefin layer". The layered product of the present invention may include a first polyolefin layer disposed as one of the outermost layers and a second polyolefin layer disposed as the other outermost layer. In this case, the first polyolefin layer and the second polyolefin layer may be the same as or different from each other.

[Configuration of Layered Product]

The layered product of the present invention may consist only of the base (X), the layer (Y), and the layer (Z), or may include an additional layer (e.g., an adhesive layer). The layered product of the present invention may include two or more layers (Y) and/or two or more layers (Z). Specific examples of the configuration of the layered product of the present invention are listed below. The layered product may have an adhesive layer such as the adhesive layer (L) or an additional layer; however, the adhesive layer or additional layer is omitted in the following specific examples.

(1) Layer (YZ)/polyester layer,
(2) Layer (YZ)/polyester layer/layer (YZ),
(3) Layer (YZ)/polyamide layer,
(4) Layer (YZ)/polyamide layer/layer (YZ),
(5) Layer (YZ)/polyolefin layer,
(6) Layer (YZ)/polyolefin layer/layer (YZ),
(7) Layer (YZ)/hydroxy group-containing polymer layer,
(8) Layer (YZ)/hydroxy group-containing polymer layer/layer (YZ),
(9) Layer (YZ)/paper layer,
(10) Layer (YZ)/paper layer/layer (YZ),
(11) Layer (YZ)/inorganic deposited layer/polyester layer,
(12) Layer (YZ)/inorganic deposited layer/polyamide layer,
(13) Layer (YZ)/inorganic deposited layer/polyolefin layer,
(14) Layer (YZ)/inorganic deposited layer/hydroxy group-containing polymer layer,
(15) Layer (YZ)/polyester layer/polyamide layer/polyolefin layer,
(16) Layer (YZ)/polyester layer/layer (YZ)/polyamide layer/polyolefin layer,

(17) Polyester layer/layer (YZ)/polyamide layer/polyolefin layer,
(18) Layer (YZ)/polyamide layer/polyester layer/polyolefin layer,
(19) Layer (YZ)/polyamide layer/layer (YZ)/polyester layer/polyolefin layer,
(20) Polyamide layer/layer (YZ)/polyester layer/polyolefin layer,
(21) Layer (YZ)/polyolefin layer/polyamide layer/polyolefin layer,
(22) Layer (YZ)/polyolefin layer/layer (YZ)/polyamide layer/polyolefin layer,
(23) Polyolefin layer/layer (YZ)/polyamide layer/polyolefin layer,
(24) Layer (YZ)/polyolefin layer/polyolefin layer,
(25) Layer (YZ)/polyolefin layer/layer (YZ)/polyolefin layer,
(26) Polyolefin layer/layer (YZ)/polyolefin layer,
(27) Layer (YZ)/polyester layer/polyolefin layer,
(28) Layer (YZ)/polyester layer/layer (YZ)/polyolefin layer,
(29) Polyester layer/layer (YZ)/polyolefin layer,
(30) Layer (YZ)/polyamide layer/polyolefin layer,
(31) Layer (YZ)/polyamide layer/layer (YZ)/polyolefin layer,
(32) Polyamide layer/layer (YZ)/polyolefin layer,
(33) Layer (YZ)/polyester layer/paper layer,
(34) Layer (YZ)/polyamide layer/paper layer,
(35) Layer (YZ)/polyolefin layer/paper layer,
(36) Polyolefin layer/paper layer/polyolefin layer/layer (YZ)/polyester layer/polyolefin layer,
(37) Polyolefin layer/paper layer/polyolefin layer/layer (YZ)/polyamide layer/polyolefin layer,
(38) Polyolefin layer/paper layer/polyolefin layer/layer (YZ)/polyolefin layer,
(39) Paper layer/polyolefin layer/layer (YZ)/polyester layer/polyolefin layer,
(40) Polyolefin layer/paper layer/layer (YZ)/polyolefin layer,
(41) Paper layer/layer (YZ)/polyester layer/polyolefin layer,
(42) Paper layer/layer (YZ)/polyolefin layer,
(43) Layer (YZ)/paper layer/polyolefin layer,
(44) Layer (YZ)/polyester layer/paper layer/polyolefin layer,
(45) Polyolefin layer/paper layer/polyolefin layer/layer (YZ)/polyolefin layer/hydroxy group-containing polymer layer,
(46) Polyolefin layer/paper layer/polyolefin layer/layer (YZ)/polyolefin layer/polyamide layer,
(47) Polyolefin layer/paper layer/polyolefin layer/layer (YZ)/polyolefin layer/polyester layer,
(48) Inorganic deposited layer/layer (YZ)/polyester layer,
(49) Inorganic deposited layer/layer (YZ)/polyester layer/layer (YZ)/inorganic deposited layer,
(50) Inorganic deposited layer/layer (YZ)/polyamide layer,
(51) Inorganic deposited layer/layer (YZ)/polyamide layer/layer (YZ)/inorganic deposited layer,
(52) Inorganic deposited layer/layer (YZ)/polyolefin layer,
(53) Inorganic deposited layer/layer (YZ)/polyolefin layer/layer (YZ)/inorganic deposited layer According to the present invention, it is possible to obtain a multilayer structure that has an oxygen transmission rate of 2 mL/(m²·day·atm) or less at 20° C. and 85% RH. It is also possible to obtain a multilayer structure that has a moisture permeability of 2.0 g/(m²/day) or less at 40° C. and 90% RH. The method and conditions for measurement of the oxygen transmission rate and the moisture permeability are as described later in "EXAMPLES".

[Applications]

The multilayer structure of the present invention has good gas barrier properties and is capable of maintaining the gas barrier properties at a high level even when exposed to physical stresses such as deformation and impact. The present invention also makes it possible to obtain a multilayer structure having good appearance. The multilayer structure of the present invention and a packaging material including the multilayer structure can therefore be used in various applications.

[Packaging Material]

The packaging material of the present invention includes a multilayer structure including a base (X) and a layer (Y) stacked on the base (X). The packaging material may consist only of the multilayer structure. That is, in the following description, the term "packaging material" may be interchanged with the term "multilayer structure". In addition, the term "packaging material" is typically interchangeable with the term "package". The packaging material may be composed of the multilayer structure and another member.

The packaging material according to a preferred embodiment of the present invention has barrier properties against inorganic gases (such as hydrogen, helium, nitrogen, oxygen, and carbon dioxide), natural gases, water vapor, and organic compounds that are liquid at ordinary temperature and pressure (such as ethanol and gasoline vapor).

When the packaging material of the present invention is in the form of a packaging bag, the multilayer structure may be used over the entirety of the packaging bag or the multilayer structure may be used in a part of the packaging bag. For example, the multilayer structure may constitute 50% to 100% of the total area of the packaging bag. The same applies to the case where the packaging material is in a form other than a packaging bag (in the form of a container or a lid, for example).

The packaging material of the present invention can be fabricated by various methods. For example, a container (packaging material) may be fabricated by subjecting a sheet of the multilayer structure or a film material including the multilayer structure (such a material will hereinafter be simply referred to as "film material") to a joining process and thereby forming the sheet of the multilayer structure or the film material into a predetermined container shape. Examples of the method for shaping include thermoforming, injection molding, and extrusion blow molding. Alternatively, a container (packaging material) may be fabricated by forming the layer (Y) on the base (X) that has been formed in a predetermined container shape. A container thus fabricated may be referred to as a "packaging container" herein.

The packaging material including the multilayer structure of the present invention may be used after being formed into any of various shaped products by secondary processing. Such a shaped product may be a vertical form-fill-seal bag, a vacuum packaging bag, a pouch, a laminated tube container, an infusion bag, a paper container, a strip tape, a container lid, an in-mold labeled container, or a vacuum insulator. These shaped products may be formed through heat sealing.

[Vertical Form-Fill-Seal Bag]

The packaging material including the multilayer structure of the present invention may be a vertical form-fill-seal bag. The vertical form-fill-seal bag can be produced by a vertical form-fill-seal machine. Various methods can be employed for bag making by a vertical form-fill-seal machine. In any method, the substance to be contained in the bag is fed through the top opening of the bag into its interior, and the opening is then sealed to produce the vertical form-fill-seal bag. The vertical form-fill-seal bag is composed of, for example, one film material heat-sealed at three portions, its upper edge, lower edge, and side. The vertical form-fill-seal bag including the multilayer structure of the present invention has good gas barrier properties and maintains the gas barrier properties even when exposed to physical stresses such as deformation and impact. The vertical form-fill-seal bag is therefore capable of preventing quality degradation of the contained substance over a long period of time.

Preferred configurations of the multilayer structure for the vertical form-fill-seal bag include configurations of "multilayer barrier film/polyamide layer/polyolefin layer", "multilayer barrier film/polyolefin layer", and "polyolefin layer/multilayer barrier film/polyolefin layer". These configurations may employ a polyamide film as the base of the multilayer barrier film. The vertical form-fill-seal bag maintains its gas barrier properties even when exposed to physical stresses such as deformation and impact. Adhesive layers may be provided between these layers constituting the vertical form-fill-seal bag. When the layer (YZ) lies on one surface of the base in the multilayer structure of the present invention, the layer (YZ) may face either outwardly or inwardly in the vertical form-fill-seal bag. When a heat-sealable layer is provided only on a side corresponding to the inner side of the packaging material (bag), the body portion of the bag is typically sealed with a fin seal. When heat-sealable layers are provided on both sides corresponding to the inner and outer sides of the shaped product, the body portion of the product is typically sealed with a lap seal.

[Vacuum Packaging Bag]

The packaging material including the multilayer structure of the present invention may be a vacuum packaging bag. The vacuum packaging bag can be produced using a nozzle-type or chamber-type vacuum packaging machine. The vacuum packaging bag as the packaging container according to the present invention has good gas barrier properties and maintains the gas barrier properties even when exposed to physical stresses such as deformation and impact. The barrier performance of the vacuum packaging bag therefore hardly decreases over a long period of time, and the quality degradation of the contained substance (such as a food) can be prevented over a long period of time. Since this vacuum packaging bag is flexible and thus deformable to be in close contact with a food containing a solid material, it is easy to remove the air from the bag by degassing for vacuum packaging. Therefore, this vacuum packaging bag allows the amount of residual oxygen in a vacuum-packaged product to be reduced and thus has high long-term storage stability for foods. Furthermore, pointed or folded portions are less likely to be formed after vacuum packaging and thus defects such as cracks and pinholes are less likely to occur. In addition, the vacuum packaging bag is capable of preventing pinholes from being formed due to rubbing between the vacuum packaging bags and between the vacuum packaging bag and a corrugated fiberboard.

Preferred configurations of the multilayer structure for the vacuum packaging bag include configurations of "multilayer barrier film/polyamide layer/polyolefin layer" and "polyamide layer/multilayer barrier film/polyolefin layer". These configurations may employ a polyamide film as the base of the multilayer barrier film. The vacuum packaging bag including such multilayer structure is superior particularly in terms of the gas barrier properties exhibited after vacuum packaging or after vacuum packaging and heat sterilization. When the layer (YZ) is stacked only on one surface of the base, the layer (YZ) may be located outwardly or inwardly of the base in the vacuum packaging bag.

[Pouch]

Figure 2:
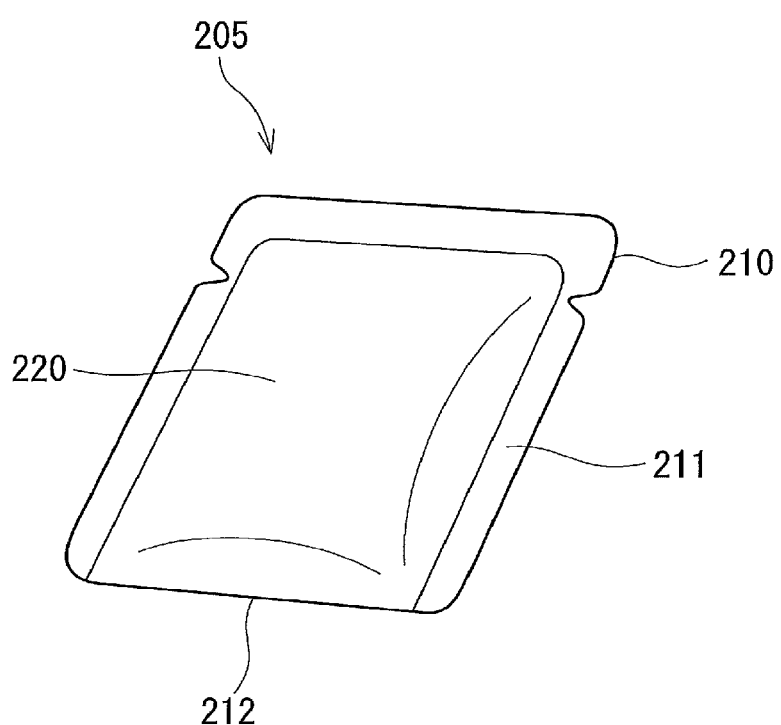
FIG. 2 is a schematic view showing an example of a flat pouch according to the present invention.

The packaging material including the multilayer structure of the present invention may be a pouch. An example is shown in FIG. 2. A flat pouch 205 of FIG. 2 is formed by folding a film material (multilayer structure) 210 along a folding portion 212 at its center into two parts and joining the parts together at their three sealed portions 211. The separation barrier 220 of the pouch 205 is composed of two faces connected along the folding portion 212. The term "pouch" as used herein generally refers to a container including a film material as a barrier member and intended to contain a food, a daily commodity, or a medical product. Pouches can have various shapes and applications, and examples include a spouted pouch, a zippered pouch, a flat pouch, a stand-up pouch, a horizontal form-fill-seal pouch, and a retort pouch. Such a pouch may be formed by stacking a multilayer barrier film and at least another layer together. The pouch as the packaging container according to the present invention has good gas barrier properties and maintains the gas barrier properties even when exposed to physical stresses such as deformation and impact. The pouch is therefore capable of preventing the contained substance from changing in quality after transportation or long-term storage. An example of the pouch can hold good transparency, which allows easy identification of the contained substance and easy check for change in the quality of the contained substance caused by degradation.

Preferred configurations of the multilayer structure for the pouch include configurations of "multilayer barrier film/polyamide layer/polyolefin layer" and "polyamide layer/multilayer barrier film/polyolefin layer". Adhesive layers may be provided between these layers. When the layer (YZ) is stacked only on one surface of the base, the layer (YZ) may be located outwardly or inwardly of the base in the pouch.

[Laminated Tube Container]

Figure 3:
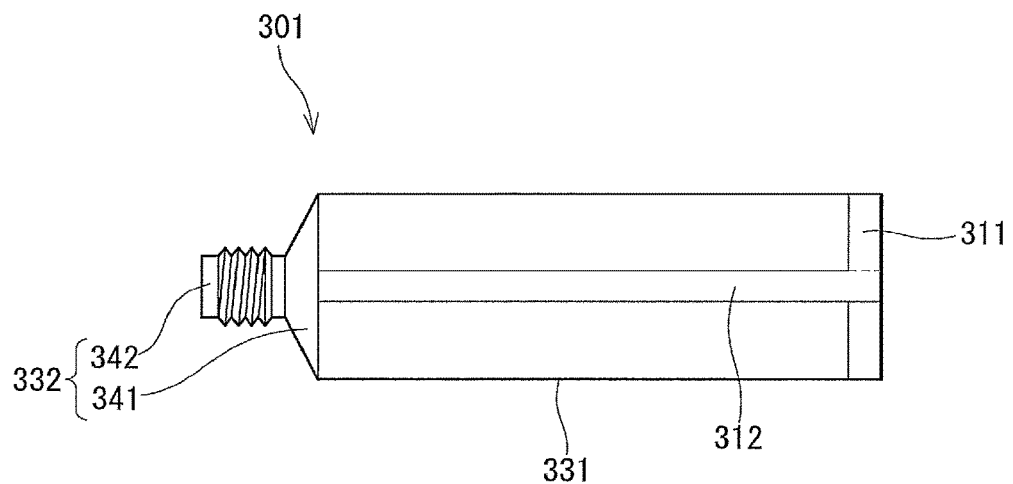
FIG. 3 is a schematic view showing an example of a laminated tube container according to the present invention.

An example of the packaging material including the multilayer structure of the present invention is shown in FIG. 3. A laminated tube container 301 of FIG. 3 includes: a body portion 331 including a laminated film 310 as a separation barrier 320 separating the interior of the container from the outside; and a shoulder portion 332. The shoulder portion 332 includes a tubular outlet portion 342 having a through hole (outlet orifice) and a base portion 341 having the shape of a hollow frustum of a cone. More specifically, the laminated tube container includes: the body portion 331 that is a tubular portion having one end closed; the shoulder portion 332 disposed at the other end of the body portion 331; an end sealed portion 311; and a side sealed portion 312, and the shoulder portion 332 includes: the tubular outlet portion 342 having a through hole (outlet orifice) and having a male thread on its outer circumference; and the base portion 341 having the shape of a hollow frustum of a cone. A cap having a female thread engageable with the male thread may be detachably attached to the outlet portion 342. It is preferable for the laminated film 310 forming the barrier member of the body portion 331 to have flexibility. A shaped component made of metal or resin can be used as the shoulder portion 332. The laminated tube container may serves as the packaging container according to the present invention. The laminated tube container has good gas barrier properties and maintains the gas barrier properties even when exposed to physical stresses such as deformation and impact. In addition, the laminated tube container has good transparency, which allows easy identification of the contained substance or easy check for change in the quality of the contained substance caused by degradation.

Preferred configurations for the laminated tube container include configurations of "polyolefin layer/multilayer barrier film/polyolefin layer" and "polyolefin layer/pigment-containing polyolefin layer/polyolefin layer/multilayer barrier film/polyolefin layer". Adhesive layers may be provided between these layers. When the layer (YZ) is stacked only on one surface of the base, the layer (YZ) may be located outwardly or inwardly of the base in the laminated tube container.

[Infusion Bag]

The packaging material including the multilayer structure of the present invention may be an infusion bag. The infusion bag is a container intended to contain an infusion drug and includes the film material as a separation barrier separating the interior for containing the infusion drug from the outside. The infusion bag as the packaging container according to the present invention has good gas barrier properties and maintains the gas barrier properties even when exposed to physical stresses such as deformation and impact. The infusion bag can therefore prevent the contained liquid medical product from changing in quality before, during, and after heat sterilization, after transportation, and after storage.

Preferred configurations of the multilayer structure for the infusion bag include configurations of "multilayer barrier film/polyamide layer/polyolefin layer" and "polyamide layer/multilayer barrier film/polyolefin layer". Adhesive layers may be provided between these layers. When the layer (YZ) is stacked only on one surface of the base, the layer (YZ) may be located outwardly or inwardly of the base in the infusion bag.

[Paper Container]

Figure 4:
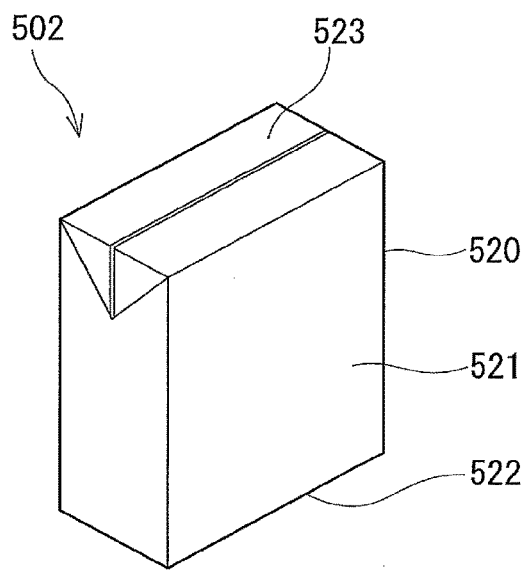
FIG. 4 is a schematic view showing an example of a brick-type paper container according to the present invention.

The packaging material including the multilayer structure of the present invention may be a paper container. The paper container is a container having a separation barrier separating the interior for containing a substance from the outside, the separation barrier including a paper layer. In a preferred example, at least a part of the separation barrier includes a multilayer structure, and the multilayer structure includes the base (X) and the layer (Y). The paper layer may be included in the base (X). An example is shown in FIG. 4. A paper container 502 in FIG. 4 includes a top portion 523, four side surfaces 521, and a bottom surface 522. A separation barrier 520 separating the interior of the container from the outside is formed using a multilayer structure. The paper container may be formed in a predetermined shape having a bottom such as a shape of the brick type or the gable top type. The paper container as the packaging container according to the present invention suffers little deterioration in gas barrier properties even when subjected to a folding process. In addition, the paper container can be preferably used as a windowed container by virtue of the layer (YZ) having good transparency. The paper container is also suitable for heating by a microwave oven.

Preferred configurations of the multilayer structure for the paper container include a configuration of "heat-resistant polyolefin layer/paper layer/heat-resistant polyolefin layer/multilayer barrier film/heat-resistant polyolefin layer". Adhesive layers may be provided between these layers. In this example, each heat-resistant polyolefin layer may be either a biaxially-oriented heat-resistant polyolefin film or a non-oriented heat-resistant polyolefin film. The heat-resistant polyolefin layers disposed as the outermost layers of the multilayer structure are preferably non-oriented polypropylene films in terms of ease of forming process. Similarly, the heat-resistant polyolefin layer disposed inwardly of the outermost layers of the multilayer structure is preferably a non-oriented polypropylene film. In a preferred example, all the heat-resistant polyolefin layers included in the multilayer structure are non-oriented polypropylene films.

[Strip Tape]

When a paper container is fabricated by subjecting a sheet of layered product to a joining (sealing) process, a strip tape may be used as a component for sealing of the layered product. The strip tape is a strip-shaped member used to join together portions of a barrier member (layered product) constituting a separation barrier of the paper container. The paper container according to the present invention may include the strip tape at a bonding portion at which portions of the layered product are joined together. In this case, the strip tape may include a multilayer structure having the same layer configuration as the multilayer structure included in the separation barrier of the paper container. In a preferred example of the strip tape, both of the outermost layers are polyolefin layers adapted for heat sealing. Such a strip tape serves to prevent the property deterioration at the bonding portion where the gas barrier properties or water vapor barrier properties are prone to deterioration. This strip tape is therefore useful also for a paper container that does not fall under the category of the packaging container according to the present invention.

[Container Lid]

The packaging material including the multilayer structure of the present invention may be a container lid. The container lid includes the film material functioning as a part of a separation barrier separating the interior of a container from the outside of the container. The container lid is combined with a container body, for example, by a joining (sealing) process using heat sealing or an adhesive in such a manner as to close an opening of the container body. A container (lidded container) having a hermetically-closed internal space is thus formed. The container lid is joined to the container body typically at its edge(s). In this case, the central portion bounded by the edge(s) faces the internal space of the container. The container body is, for example, a shaped body having a cup shape, a tray shape, or another shape. The container body includes, for example, a wall portion and a flange portion for sealing of the container lid. The container lid as the packaging container according to the present invention has good gas barrier properties and maintains the gas barrier properties even when exposed to physical stresses such as deformation and impact, thus being capable of preventing quality degradation of the contained substance such as a food over a long period of time. The container lid can be preferably used as a lid of a container used for storage of a substance such as a foodstuff.

Preferred configurations of the multilayer structure for the container lid include configurations of "multilayer barrier film/polyamide layer/polyolefin layer" and "multilayer barrier film/polyolefin layer". These configurations may employ a polyamide film as the base of the multilayer barrier film. Adhesive layers may be provided between these layers. When the layer (YZ) lies on one surface of the base in the multilayer structure, the layer (YZ) may be located inwardly of the base (closer to the container than the base) or outwardly of the base.

[In-Mold Labeled Container]

The packaging material including the multilayer structure of the present invention may be an in-mold labeled container. The in-mold labeled container includes a container body and a multilayer label (multilayer structure) according to the present invention which is provided on the surface of the container body. The container body is formed through injection of a molten resin into a mold. The shape of the container body is not particularly limited, and may be a cup shape or a bottle shape, for example.

An example of the method for producing the container according to the present invention includes: a first step of placing a multilayer label of the present invention in a cavity between a female mold member and a male mold member; and a second step of injecting a molten resin into the cavity to perform molding of a container body and lamination of the multilayer label of the present invention to the container body simultaneously. Each step can be carried out in the same manner as in commonly-known methods, except for using the multilayer label of the present invention.

[Vacuum Insulator]

The vacuum insulator of the present invention at least partially includes the packaging material as described above. The vacuum insulator of the present invention is a heat insulator including a sheath material and a core material disposed in an interior bounded by the sheath material, and the interior in which the core material is disposed has a reduced pressure. A vacuum insulator thinner and lighter than an insulator made of urethane foam can provide heat insulating properties comparable to the heat insulating properties provided by the urethane foam insulator. The vacuum insulator of the present invention is capable of maintaining the heat-insulating effect over a long period of time and can therefore be used, for example, as or in: a heat insulating material for home electric appliances such as refrigerators, hot-water supply systems, and rice cookers; a residential heat insulating material used in walls, ceilings, attics, floors, etc.; a vehicle roof member; an insulating panel for automatic vending machines etc.; and a heat transfer apparatus such as an apparatus employing a heat pump.

Figure 5:
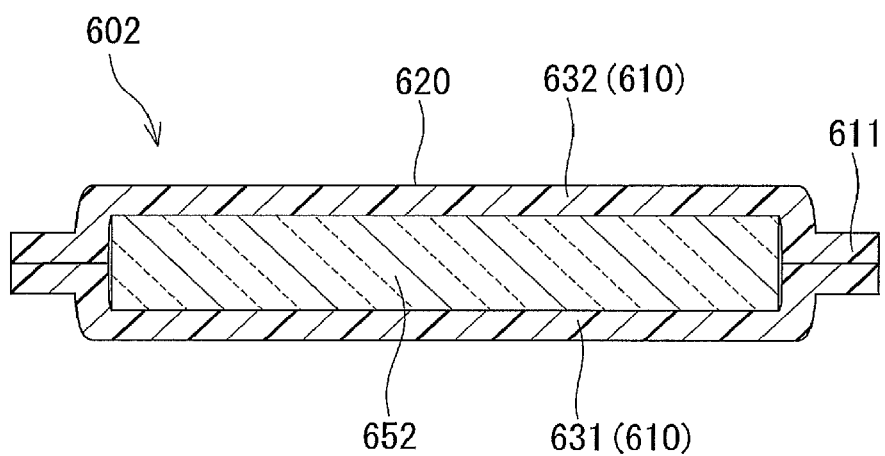
FIG. 5 is a schematic view showing an example of a vacuum insulator according to the present invention.

An example of the vacuum insulator according to the present invention is shown in FIG. 5. A vacuum insulator 602 of FIG. 5 includes a core material 652 formed as a single body and a sheath material 610 enclosing the core material 652. The sheath material 610 is constituted by two film materials 631 and 632 joined together at their edges 611, and the core material 652 is disposed in an interior bounded by the sheath material 610. The sheath material 610 functions as a separation barrier 620 separating the interior containing the core material 652 from the outside and, due to pressure difference between the interior and the outside, is in close contact with the core material 652. The interior in which the core material 652 is disposed has a reduced pressure. The core material 652 is typically a foamed resin.

The material and form of the core material are not particularly limited as long as they are adapted for heat insulation. Examples of the core material include a perlite powder, a silica powder, a precipitated silica powder, diatomite, calcium silicate, glass wool, rockwool, artificial (synthetic) wool, and foamed resins (such as styrene foam and urethane foam). A hollow container or a honeycomb structure formed in a predetermined shape can also be used as the core material.

Preferred configurations of the multilayer structure for the vacuum insulator include configurations of "multilayer barrier film/polyamide layer/polyolefin layer" and "polyamide layer/multilayer barrier film/polyolefin layer". Adhesive layers may be provided between these layers. When the layer (YZ) is stacked only on one surface of the base, the layer (YZ) may be located outwardly or inwardly of the base in the vacuum insulator.

[Electronic Device]

An embodiment of the present invention may be an electronic device including the multilayer structure described above. The electronic device is, for example, an electronic device that includes an electronic device body, sealing materials stacked on both sides of the electronic device body to seal the electronic device body, and a protective sheet (multilayer structure) stacked on the sealing material to protect the surface of the electronic device body. The sealing materials each cover the entire surface of the electronic device body. The protective sheet may be disposed only on one of the sealing materials. Another protective sheet may be disposed on the other surface. In the case where the protective sheets are disposed on both sides, these protective sheets may be the same as or different from each other. The protective sheet may be disposed on the surface of the electronic device body with another member such as the sealing material being interposed therebetween or may be disposed directly on the surface of the electronic device body.

The electronic device body is not particularly limited and is, for example, a photoelectric conversion device such as a solar cell, an information display device such as an organic EL display, liquid crystal display, or electronic paper, or a lighting device such as an organic EL light-emitting element. The sealing material is an optional member that can be added as appropriate depending on, for example, the type and use of the electronic device body. Examples of the sealing material include ethylene-vinyl acetate copolymer and polyvinyl butyral.

A preferred example of the electronic device body is a solar cell. Examples of the solar cell include a silicon solar cell, a compound semiconductor solar cell, and an organic thin-film solar cell. Examples of the silicon solar cell include a monocrystalline silicon solar cell, a polycrystalline silicon solar cell, and an amorphous silicon solar cell. Examples of the compound semiconductor solar cell include a III-V compound semiconductor solar cell, a II-VI compound semiconductor solar cell, and a I-III-VI compound semiconductor solar cell. Examples of the organic thin-film solar cell include a p-n heterojunction organic thin-film solar cell and a bulk heterojunction organic thin-film solar cell. The solar cell may be an integrated solar cell including a plurality of unit cells connected in series.

In the case where the electronic device of the present invention is a solar cell, the multilayer structure of the present invention is used as a solar cell member such as, for example, a film for IC tags, a solar cell module, a back sheet for solar cells, and a protective sheet for solar cells. In the case where the electronic device of the present invention is a display, the multilayer structure of the present invention is used as a display member such as, for example, a substrate film for organic EL devices, a substrate film for electronic paper, a sealing film for electronic devices, and a film for PDPs. In the case where the multilayer structure is used as a display member, it is used as a low-reflection film, for example. In any of these cases, when the multilayer structure is required to permit transmission of light, a light-transmitting layer (Z) is used as the layer (Z).

Depending on the type of the electronic device body, it can be fabricated by a so-called roll-to-roll process. In the roll-to-roll process, a flexible substrate (e.g., a stainless steel substrate or a resin substrate) wound around a feed roll is delivered from the feed roll, an element is formed on this substrate to fabricate the electronic device body, and the electronic device body is wound on a take-up roll. In this case, it is advantageous that the protective sheet be prepared beforehand in the form of a flexible long sheet, more particularly in the form of a wound roll of the long sheet. In an example, the protective sheet delivered from a feed roll is stacked onto the electronic device body that has yet to be wound on the take-up roll and is wound up together with the electronic device body. In another example, the electronic device body that has been wound on the take-up roll once may be fed from the roll again and stacked onto the protective sheet. In a preferred example of the present invention, the electronic device per se has flexibility.

The protective sheet includes the multilayer structure described above. The protective sheet may consist only of the multilayer structure. Alternatively, the protective sheet may include the multilayer structure and another member (e.g., an additional layer) stacked on the multilayer structure. The thickness and material of the protective sheet are not particularly limited, as long as the sheet is a sheet of layered product suitable for protection of a surface of an electronic device and includes the multilayer structure described above.

The protective sheet may, for example, include a surface protection layer disposed on one or both of the surfaces of the multilayer structure. It is preferable for the surface protection layer to be a layer made of a scratch-resistant resin. A surface protection layer for a device such as a solar cell which may be used outdoors is preferably made of a resin having high weather resistance (e.g., light resistance). For protecting a surface required to permit transmission of light, a surface protection layer having high light transmittance is preferred. Examples of the material of the surface protection layer (surface protection film) include poly(meth) acrylic acid ester, polycarbonate, polyethylene terephthalate, polyethylene-2,6-naphthalate, polyvinyl fluoride (PVF), polyvinylidene fluoride (PVDF), polytetrafluoroethylene (PTFE), polychlorotrifluoroethylene (PCTFE), ethylene-tetrafluoroethylene copolymer (ETFE), ethylene-chlorotrifluoroethylene copolymer (ECTFE), tetrafluoroethylene-perfluoroalkyl vinyl ether copolymer (PFA), and tetrafluoroethylene-hexafluoropropylene copolymer (FEP). In an example, the protective sheet includes a poly(meth) acrylic acid ester layer disposed on one of its surfaces.

An additive (e.g., an ultraviolet absorber) may be added to the surface protection layer to increase the durability of the surface protection layer. A preferred example of the surface protection layer having high weather resistance is an acrylic resin layer to which an ultraviolet absorber has been added. Examples of the ultraviolet absorber include, but are not limited to, ultraviolet absorbers based on benzotriazole, benzophenone, salicylate, cyanoacrylate, nickel, or triazine. In addition, another additive such as a stabilizer, light stabilizer, or antioxidant may be used in combination.

The multilayer structure of the present invention can have barrier properties against water vapor as well as gas barrier properties. Such a multilayer structure is capable of maintaining the water vapor barrier properties at a high level even when exposed to physical stresses such as deformation and impact. This characteristic can be highly beneficial to the durability of a product fabricated using the multilayer structure of the present invention, particularly when the product is a solar cell member or display member.

EXAMPLES

Hereinafter, the present invention will be described in more detail by way of examples. The present invention is not limited by these examples in any respect, and it should be understood that many modifications can be made by any ordinarily skilled person in the art within the technical concept of the present invention. Measurement and evaluation in Examples and Comparative Examples given below were performed as will now be described.

(1) Measurement of Infrared Absorption Spectrum

The measurement was performed by attenuated total reflection spectroscopy using a Fourier transform infrared spectrophotometer. The measurement conditions were as follows.

Apparatus: Spectrum One, manufactured by PerkinElmer, Inc.

Measurement mode: Attenuated total reflection spectroscopy

Measurement range: 800 to 1,400 $cm^{-1}$ (2) Measurement of Respective Thicknesses of Layers Each multilayer structure was cut using a focused ion beam (FIB) to prepare a section (thickness: 0.3 µm) for cross-sectional observation. The prepared section was secured to a sample stage with a carbon tape and subjected to platinum ion sputtering at an accelerating voltage of 30 kV for 30 seconds. The cross-section of the multilayer structure was observed using a field-emission transmission electron microscope to determine the respective thicknesses of the layers. The measurement conditions were as follows.

Apparatus: JEM-2100F, manufactured by JEOL Ltd.

Accelerating voltage: 200 kV

Magnification: ±250,000

(3) Measurement of Oxygen Transmission Rates of Layered Product and Multilayer Structure A layered product and a multilayer structure were each set to an oxygen transmission rate measurement apparatus in such a manner that the layer as the base faced the carrier gas side, and the oxygen transmission rate was measured. The measurement conditions were as follows.

Apparatus: MOCON OX-TRAN 2/20, manufactured by ModernControls, Inc.

Temperature: 20° C.

Humidity on oxygen feed side: 85% RH

Humidity on carrier gas side: 85% RH

Oxygen pressure: 1 atmosphere

Carrier gas pressure: 1 atmosphere (4) Measurement of Moisture Permeabilities of Layered Product and Multilayer Structure A layered product and a multilayer structure were each set to a water vapor transmission rate measurement apparatus in such a manner that the layer as the base faced the carrier gas side, and the moisture permeability (water vapor transmission rate) was measured. The measurement conditions were as follows.

Apparatus: MOCON PERMATRAN 3/33, manufactured by ModernControls, Inc.

Temperature: 40° C.

Humidity on water vapor feed side: 90% RH

Humidity on carrier gas side: 0% RH

Production Example of Coating Liquid (T-1)

Distilled water in an amount of 230 parts by mass was heated to 70° C. under stirring. Triisopropoxyaluminum in an amount of 88 parts by mass was added dropwise to the distilled water over 1 hour, the liquid temperature was gradually increased to 95° C., and isopropanol generated was distilled off. In this manner, hydrolytic condensation was performed. To the resulting liquid was added 4.0 parts by mass of a 60 mass % aqueous nitric acid solution, and this was followed by stirring at 95° C. for 3 hours to deflocculate agglomerates of particles of the hydrolytic condensate. After that, the liquid was concentrated so that it had a solids concentration of 10 mass % in terms of aluminum oxide. To 18.66 parts by mass of the thus obtained dispersion were added 58.19 parts by mass of distilled water, 19.00 parts by mass of methanol, and 0.50 parts by mass of a 5 mass % aqueous polyvinyl alcohol solution (PVA 124, manufactured by KURARAY CO., LTD.; degree of saponification=98.5 mol %, viscosity-average degree of polymerization=2,400, viscosity of 4 mass % aqueous solution at 20° C.=60 mPa·s). This was followed by stirring to obtain a homogeneous dispersion. Subsequently, 3.66 parts by mass of an 85 mass % aqueous phosphoric acid solution was added dropwise to the dispersion under stirring, with the liquid temperature held at 15° C. The stirring was continued at 15° C. until a viscosity of 1,500 mPa·s was reached, and the intended coating liquid (T-1) was thus obtained. In the coating liquid (T-1), the molar ratio between aluminum atoms and phosphorus atoms, as expressed by aluminum atoms=phosphorus atoms, was 1.15=1.00.

Synthesis Example of Polymer (Aa-1)

Under nitrogen atmosphere, 8.5 g of 2-phosphonooxyethyl methacrylate and 0.1 g of azobisisobutyronitrile were dissolved in 17 g of methyl ethyl ketone, and the resulting solution was stirred at 80° C. for 12 hours. The polymer solution obtained was cooled and then added to 170 g of 1,2-dichloroethane. This was followed by decantation to collect the polymer formed as a precipitate. Subsequently, the polymer was dissolved in tetrahydrofuran, and the solution was subjected to purification by reprecipitation using 1,2-dichloroethane as a poor solvent. The purification by reprecipitation was repeated three times, followed by vacuum drying at 50° C. for 24 hours to obtain a polymer (Aa-1). The polymer (Aa-1) was a polymer of 2-phosphonooxyethyl methacrylate. As a result of GPC analysis, the number average molecular weight of the polymer was determined to be 10,000 on a polystyrene-equivalent basis.

Synthesis Example of Polymer (Aa-2)

A polymer (Aa-2) was obtained in the same manner as in the synthesis example of the polymer (Aa-1), except for using a mixture of 2-phosphonooxyethyl methacrylate and acrylonitrile (at a molar ratio, 2-phosphonooxyethyl methacrylate:acrylonitrile, of 2:1) instead of using 2-phosphonooxyethyl methacrylate alone. The polymer (Aa-2) was a copolymer of 2-phosphonooxyethyl methacrylate and acrylonitrile. As a result of GPC analysis, the number average molecular weight of the polymer was determined to be 10,000 on a polystyrene-equivalent basis.

Synthesis Example of Polymer (Aa-3)

Under nitrogen atmosphere, 10 g of vinylphosphonic acid and 0.025 g of 2,2'-azobis(2-amidinopropane) dihydrochloride were dissolved in 5 g of water, and the resulting solution was stirred at 80° C. for 3 hours. After being cooled, the polymer solution was diluted by the addition of 15 g of water and then filtered using "Spectra/Por" (registered trademark), a cellulose membrane manufactured by Spectrum Laboratories, Inc. Water was removed from the filtrate by distillation, followed by vacuum drying at 50° C. for 24 hours to obtain a polymer (Aa-3). The polymer (Aa-3) was poly(vinylphosphonic acid). As a result of GPC analysis, the number average molecular weight of the polymer was determined to be 10,000 on a polyethylene glycol-equivalent basis.

Production Example of Coating Liquid (S-1)

The polymer (Aa-1) obtained in the above synthesis example was dissolved in a mixed solvent of water and methanol (at a mass ratio, water:methanol, of 7:3) to obtain a coating liquid (S-1) having a solids concentration of 1 mass %.

Production Examples of Coating Liquids (S-2) and (S-3)

Coating liquids (S-2) and (S-13) were produced in the same manner as in the production of the coating liquid (S-1), except for using the polymer (Aa-2) and the polymer (Aa-3) instead of the polymer (Aa-1).

The details of films used in Examples and Comparative Examples were as follows.
1) PET 12: Oriented polyethylene terephthalate film; "Lumirror P60" (trade name), manufactured by Toray Industries, Inc. and having a thickness of 12 μm
2) ONY: Oriented nylon film; "EMBLEM ONBC" (trade name), manufactured by UNITIKA LTD. and having a thickness of 15 μm

[Example 1] Multilayer Structure

Example 1-1

First, a PET 12 was prepared as the base (X). The coating liquid (T-1) was applied onto this base (X) using a bar coater in such a manner that the dry thickness would be 0.3 μm. The applied film was dried at 110° C. for 5 minutes and then heat-treated at 160° C. for 1 minute to form the layer (Z1) on the base. A structure having a configuration of "base (X)/layer (Z1)" was thus obtained. As a result of measurement of the infrared absorption spectrum of the obtained structure, the maximum absorption wavenumber in the region of 800 to 1,400 $cm^{-1}$ was determined to be 1,108 $cm^{-1}$, and the half width of the maximum absorption band was determined to be 37 $cm^{-1}$. Subsequently, the coating liquid (S-1) was applied onto the structure using a bar coater in such a manner that the dry thickness would be 0.05 μm, and then was dried at 220° C. for 1 minute to form the layer (Y). A layered product (1-1-1) having a configuration of "base (X)/layer (Z1)/layer (Y)" was thus obtained.

Next, an adhesive layer (L) was formed on the layer (Y) of the layered product (1-1-1), and then a polyethylene resin (density: 0.917 $g/cm^3$, melt flow rate: 8 g/10 min) was then applied onto the adhesive layer by extrusion coating lamination at 295° C. in such a manner that the applied resin had a thickness of 20 μm. In this way, a multilayer structure (1-1-2) having a configuration of "base (X)/layer (Z1)/layer (Y)/adhesive layer (L)/layer (H)" was obtained. The adhesive layer (L) was formed by applying a two-component adhesive using a bar coater in such a manner that the dry thickness would be 0.3 μm, and then by drying the applied adhesive. This two-component adhesive used was an adhesive composed of "A-3210" of "TAKELAC" (registered trademark) manufactured by Mitsui Chemicals, Inc. and "A-3070" of "TAKENATE" (registered trademark) manufactured by Mitsui Chemicals, Inc.

The oxygen transmission rates and moisture permeabilities of the layered product (1-1-1) and the multilayer structure (1-1-2) were measured by the methods described above.

Examples 1-2 and 1-3

Layered products (1-2-1) and (1-3-1) were fabricated in the same manner as in the fabrication of the layered product (1-1-1) of Example 1-1, except for substituting the coating liquids (S-2) and (S-3) for the coating liquid (S-1). In addition, multilayer structures (1-2-2) and (1-3-2) were obtained in the same manner as in the fabrication of the multilayer structure (1-1-2), except for using the layered products (1-2-1) and (1-3-1) instead of the layered product (1-1-1).

Examples 1-4 to 1-6

An ethylene-methacrylic acid copolymer was applied onto the layered product (1-1-1) obtained in Example 1-1 by extrusion coating lamination at 295° C. in such a manner that the applied copolymer had a thickness of 20 μm. In this way, a multilayer structure (1-4-2) having a configuration of "base (X)/layer (Z1)/layer (Y)/layer (H)" was obtained. "N0908C" of "NUCREL (registered trademark)" manufactured by Du Pont-Mitsui Polychemicals Co. Ltd. was used as the ethylene-methacrylic acid copolymer. Multilayer structures (1-5-2) and (1-6-2) of Examples 1-5 and 1-6 were obtained in the same manner as in the fabrication of the multilayer structure (1-4-2) of Example 1-4, except for substituting other layered products for the layered product (1-1-1). In Example 1-5, the layered product (1-2-1) of Example 1-2 was used instead of the layered product (1-1-1). In Example 1-6, the layered product (1-3-1) of Example 1-3 was used instead of the layered product (1-1-1).

Example 1-7 and 1-8

Multilayer structures (1-7-2) and (1-8-2) were fabricated in the same manner as in the fabrication of the multilayer structure (1-6-2) of Example 1-6, except that an ethylene-methacrylic acid copolymer was used in Example 1-7 instead of the thermoplastic resin (U) and that an ionomer composed of ethylene-methacrylic acid copolymer molecules crosslinked with metal ions was used in Example 1-8 instead of the thermoplastic resin (U). "N1108C" of "NUCREL (registered trademark)" manufactured by Du Pont-Mitsui Polychemicals Co. Ltd. was used as the ethylene-methacrylic acid copolymer. "1652" of "Hi-milan (registered trademark)" manufactured by Du Pont-Mitsui Polychemicals Co. Ltd. was used as the ionomer.

Examples 1-9 and 1-10

Layered products (1-9-1) and (1-10-1) were fabricated in the same manner as in the fabrication of the layered product (1-1-1) of Example 1-1, except for using a deposited layer formed by vacuum deposition instead of the layer (Z1). In Example 1-9, the deposited layer used was the layer (Z2) of aluminum with a thickness of 0.03 μm. In Example 1-10, the deposited layer used was the layer (Z3) of aluminum oxide with a thickness of 0.03 μm. A multilayer structure (1-9-2) of Example 1-9 and a multilayer structure (1-10-2) of Example 1-10 were fabricated in the same manner as in the fabrication of the multilayer structure (1-6-2) of Example 1-6, except for using the layered products (1-9-1) and (1-10-1) instead of the layered product (1-3-1).

Example 1-11

The layer (Z3) of aluminum oxide with a thickness of 0.03 μm was formed on the base (X) by vacuum deposition. Next, the layer (Z1) was formed on the layer (Z3) using the coating liquid (T-1) in the same manner as in Example 1-1. Subsequently, the layer (Y) with a thickness of 0.03 μm was formed on the layer (Z3) using the coating liquid (S-3) in the same manner as in Example 1-3. In this way, a layered product (1-11-1) having a configuration of "base (X)/layer (Z3)/layer (Z1)/layer (Y)" was fabricated. A multilayer structure (1-11-2) was fabricated in the same manner as in the fabrication of the multilayer structure (1-6-2) of Example 1-6, except for substituting the layered product (1-11-1) for the layered product (1-3-1).

Example 1-12

First, the layer (Z1) with a thickness of 0.03 μm was formed on the base (X) using the coating liquid (T-1) in the same manner as in Example 1-1. Next, the layer (Z3) of aluminum oxide with a thickness of 0.03 μm was formed on the layer (Z1) by vacuum deposition. Next, the layer (Y) was formed on the layer (Z3) using the coating liquid (S-3) in the same manner as in Example 1-10. In this way, a layered product (1-12-1) having a configuration of "base (X)/layer (Z1)/layer (Z3)/layer (Y)" was fabricated. A multilayer structure (1-12-2) was fabricated in the same manner as in the fabrication of the multilayer structure (1-6-2) of Example 1-6, except for substituting the layered product (1-12-1) for the layered product (1-3-1).

Comparative Example 1-1

A layered product (C1-1-1) having a configuration of "base (X)/layer (Z1) was fabricated in the same manner as in Example 1-1, except that a layer (Y1) was not formed. In addition, a multilayer structure (C1-1-2) having a configuration of "base (X)/layer (Z1)/layer (H)" was fabricated in the same manner as in the fabrication of the multilayer structure (1-6-2) of Example 1-6, except for substituting the layered product (C1-1-1) for the layered product (1-3-1).

The layered products and multilayer structures fabricated as described above were evaluated in the same manner as in the evaluation of the layered product (1-1-1) and the multilayer structure (1-1-2). The conditions of production of the layered products of Examples and Comparative Example and the results of evaluation thereof are shown in Table 1.

TABLE 1

|  | Layered product | | Coating liquid (S) | | Moisture permeability [g/(m² · day)] | Oxygen transmission rate [mL/(m² · day · atm)] |
|---|---|---|---|---|---|---|
|  | No. | Layer configuration | No. | Compound (A) | | |
| Example 1-1 | 1-1-1 | (X)/(Z1)/(Y) | S-1 | Aa-1 | 0.2 | 0.2 |
| Example 1-2 | 1-2-1 | (X)/(Z1)/(Y) | S-2 | Aa-2 | 0.2 | 0.2 |
| Example 1-3 | 1-3-1 | (X)/(Z1)/(Y) | S-3 | Aa-3 | 0.2 | 0.2 |
| Example 1-4 | 1-1-1 | (X)/(Z1)/(Y) | S-1 | Aa-1 | 0.2 | 0.2 |
| Example 1-5 | 1-2-1 | (X)/(Z1)/(Y) | S-2 | Aa-2 | 0.2 | 0.2 |
| Example 1-6 | 1-3-1 | (X)/(Z1)/(Y) | S-3 | Aa-3 | 0.2 | 0.2 |
| Example 1-7 | 1-3-1 | (X)/(Z1)/(Y) | S-3 | Aa-3 | 0.2 | 0.2 |
| Example 1-8 | 1-3-1 | (X)/(Z1)/(Y) | S-3 | Aa-3 | 0.2 | 0.2 |
| Example 1-9 | 1-9-1 | (X)/(Z2)/(Y) | S-3 | Aa-3 | 1.8 | 1.8 |
| Example 1-10 | 1-10-1 | (X)/(Z3)/(Y) | S-3 | Aa-3 | 0.8 | 0.8 |
| Example 1-11 | 1-11-1 | (X)/(Z3)/(Z1)/(Y) | S-3 | Aa-3 | 0.1 | 0.1 |
| Example 1-12 | 1-12-1 | (X)/(Z1)/(Z3)/(Y) | S-3 | Aa-3 | 0.1 | 0.1 |
| Comparative Example 1-1 | C1-1-1 | (X)/(Z1) | — | — | 0.2 | 0.2 |

The conditions of production of the multilayer structures of Examples and Comparative Example and the results of evaluation thereof are shown in Table 2.

TABLE 2

|  | Multilayer structure | | | Thermo- plastic resin (U) | Moisture permeability [g/(m² · day)] | Oxygen transmission rate [mL/(m² · day · atm)] |
|---|---|---|---|---|---|---|
|  | Layered product No. | Multilayer structure No. | Layer configuration | | | |
| Example 1-1 | 1-1-1 | 1-1-2 | (X)/(Z1)/(Y)/(L)/(H) | Polyethylene resin | 0.5 | 0.3 |
| Example 1-2 | 1-2-1 | 1-2-2 | (X)/(Z1)/(Y)/(L)/(H) | Polyethylene resin | 0.5 | 0.3 |
| Example 1-3 | 1-3-1 | 1-3-2 | (X)/(Z1)/(Y)/(L)/(H) | Polyethylene resin | 0.5 | 0.3 |
| Example 1-4 | 1-1-1 | 1-4-2 | (X)/(Z1)/(Y)/(H) | NUCREL N0908C | 0.5 | 0.3 |
| Example 1-5 | 1-2-1 | 1-5-2 | (X)/(Z1)/(Y)/(H) | NUCREL N0908C | 0.5 | 0.3 |
| Example 1-6 | 1-3-1 | 1-6-2 | (X)/(Z1)/(Y)/(H) | NUCREL N0908C | 0.5 | 0.3 |
| Example 1-7 | 1-3-1 | 1-7-2 | (X)/(Z1)/(Y)/(H) | NUCREL N1108C | 0.5 | 0.3 |
| Example 1-8 | 1-3-1 | 1-8-2 | (X)/(Z1)/(Y)/(H) | Hi-milan 1652 | 0.5 | 0.3 |
| Example 1-9 | 1-9-1 | 1-9-2 | (X)/(Z2)/(Y)/(H) | NUCREL N0908C | 2.0 | 1.9 |
| Example 1-10 | 1-10-1 | 1-10-2 | (X)/(Z3)/(Y)/(H) | NUCREL N0908C | 1.2 | 1.0 |
| Example 1-11 | 1-11-1 | 1-11-2 | (X)/(Z3)/(Z1)/(Y)/(H) | NUCREL N0908C | 0.4 | 0.2 |
| Example 1-12 | 1-12-1 | 1-12-2 | (X)/(Z1)/(Z3)/(Y)/(H) | NUCREL N0908C | 0.4 | 0.2 |
| Comparative Example 1-1 | C1-1-1 | C1-1-2 | (X)/(Z1)/(H) | NUCREL N0908C | 3.5 | 3.0 |

As shown in the above tables, the multilayer structures of the present invention maintained high barrier properties even when exposed to high physical stresses of extrusion coating lamination.

[Example 2] Laminated Tube Container

Example 2-1

In Example 2, a laminated tube container 301 shown in FIG. 2 was fabricated and evaluated.

An adhesive layer (L) was formed on the base (X) of the multilayer structure (1-1-2) fabricated in Example 1-1, and then a polyethylene resin was applied onto the adhesive layer (L) by extrusion coating lamination under the same conditions as those in Example 1-1, so that a layer (H') with a thickness of 20 μm was formed on the adhesive layer (L). The adhesive layer was formed by applying a two-component adhesive used in Example 1-1 using a bar coater in such a manner that the dry thickness would be 0.3 μm, and then by drying the applied adhesive. In this way, a laminated film having a configuration of "layer (H')/adhesive layer (L)/base (X)/layer (Z1)/layer (Y)/adhesive layer (L)/layer (H) was obtained.

First, the laminated film obtained was cut into a piece of a given shape, which was formed into a tubular roll having an overlapping portion, which was heat-sealed to produce a tubular body portion. This heat sealing was done between the layer (H') and the outer polyethylene resin layer (H). The formation of the tubular body portion was done by rolling the laminate in such a manner that the polyethylene terephthalate film as the base (X) formed the inner surface of the tubular body portion.

Next, the tubular body portion was mounted to a mandrel for tube container formation, and a shoulder portion having an outlet portion was joined to one end of the body portion. The shoulder portion was formed by compression molding of a polyethylene resin. Next, a lid (cap) made of polyethylene resin was attached to the outlet portion. Subsequently, a green horseradish paste was put into the body portion through the other open end of the body portion, and the other end was heat-sealed in such a manner that the inner circumferential surfaces formed by the inner polyethylene resin layer were in contact with each other. In this way, a laminated tube container (2-1) filled with a green horseradish paste was obtained. A measurement sample was cut out from the laminated tube container (2-1), and was subjected to measurement of the oxygen transmission rate.

The laminated tube container (2-1) was subjected to a squeeze test in which its body portion was held between fingers and the fingers were moved back and forth along the body portion longitudinally with a certain force being applied to the body portion. After the fingers were moved back and forth 5,000 times, the contained green horseradish paste was removed. A measurement sample was cut out from the laminated tube container (2-1) having undergone the squeeze test, and was subjected to measurement of the oxygen transmission rate.

Examples 2-2 to 2-12 and Comparative Example 2-1

Laminated tube containers (2-2) to (2-12) and (C2-1) were fabricated in the same manner as in Example 2-1, except for using the multilayer structures (1-2-2) to (1-12-2) and the multilayer structure (C1-1-2) instead of the multilayer structure (1-1-2) fabricated in Example 1-1. After the laminated tube containers thus obtained were subjected to a squeeze test in the same manner as Example 2-1 to obtain samples for measurement of the oxygen transmission rates before and after the squeeze test, and the samples were subjected to measurement of the oxygen transmission rates. The multilayer structures included in these laminated tube containers and the results of evaluation of the laminated tube containers are shown in Table 3.

As shown in Table 3, the laminated tube containers of the present invention maintained the gas barrier properties even when exposed to high physical stresses.

[Example 3] Flat Pouch

Example 3-1

In Example 3, a flat pouch 205 shown in FIG. 2 was fabricated and evaluated.

Two laminates with a size of 20 cm±13 cm were cut out from the multilayer structure (1-1-2) fabricated in Example 1-1. Subsequently, the two laminates cut out were stacked together in such a manner that the layers (H) were located interiorly, and the three sides of the outer periphery of the stack were heat-sealed with a seal width of 0.5 cm. A pouch opening with a length of 30 mm was then formed at an edge of the one side remaining open. Next, a 30-mm-wide sheet of polytetrafluoroethylene was inserted into the edge of the open side and, in this state, the side was heat-sealed. After the heat sealing, the sheet of polytetrafluoroethylene was removed to obtain a flat pouch (3-1). A measurement sample was cut out from the flat pouch (3-1), and was subjected to measurement of the oxygen transmission rate.

400 mL of distilled water was put into the flat pouch (3-1) so as to narrow the head space area as much as possible. Next, the opening was heat-sealed to hermetically close the pouch so as to prevent leakage of the distilled water contained. The flat pouch (3-1) having distilled water sealed therein was subjected to a bending test in which the pouch set in a position where a side (heat-sealed side) of the pouch faced downward was dropped from a height of 1.5 m five times. A measurement sample was cut out from the flat pouch (3-1) having undergone the bending test, and was subjected to measurement of the oxygen transmission rate.

Examples 3-2 to 3-12 and Comparative Example 3-1

Flat pouches (3-2) to (3-12) and (C3-1) were fabricated in the same manner as in the fabrication of the flat pouch (3-1) of Example 3-1, except for using the multilayer structures (1-2-2) to (1-12-2) and the multilayer structure (C1-1-2) instead of the multilayer structure (1-1-2). The flat pouches thus obtained were evaluated in the same manner as for the flat pouch (3-1). The multilayer structures used in the fabrication of these flat pouches and the results of evaluation of the flat pouches are shown in Table 4.

TABLE 3

| | Multilayer structure | | Oxygen transmission rate [mL/(m² · day · atm)] | |
|---|---|---|---|---|
| | No. | Layer configuration | Before squeeze test | After squeeze test |
| Example 2-1 | 1-1-2 | (X)/(Z1)/(Y)/(L)/(H) | 0.3 | 0.5 |
| Example 2-2 | 1-2-2 | (X)/(Z1)/(Y)/(L)/(H) | 0.3 | 0.5 |
| Example 2-3 | 1-3-2 | (X)/(Z1)/(Y)/(L)/(H) | 0.3 | 0.5 |
| Example 2-4 | 1-4-2 | (X)/(Z1)/(Y)/(H) | 0.3 | 0.5 |
| Example 2-5 | 1-5-2 | (X)/(Z1)/(Y)/(H) | 0.3 | 0.5 |
| Example 2-6 | 1-6-2 | (X)/(Z1)/(Y)/(H) | 0.3 | 0.5 |
| Example 2-7 | 1-7-2 | (X)/(Z1)/(Y)/(H) | 0.3 | 0.5 |
| Example 2-8 | 1-8-2 | (X)/(Z1)/(Y)/(H) | 0.3 | 0.5 |
| Example 2-9 | 1-9-2 | (X)/(Z2)/(Y)/(H) | 1.9 | 2.0 |
| Example 2-10 | 1-10-2 | (X)/(Z3)/(Y)/(H) | 1.0 | 1.2 |
| Example 2-11 | 1-11-2 | (X)/(Z3)/(Z1)/(Y)/(H) | 0.2 | 0.5 |
| Example 2-12 | 1-12-2 | (X)/(Z1)/(Z3)/(Y)/(H) | 0.2 | 0.5 |
| Comparative Example 2-1 | C1-1-2 | (X)/(Z1)/(H) | 3.0 | 7.0 |

TABLE 4

| | Multilayer structure | | Oxygen transmission rate [mL/(m² · day · atm)] | |
|---|---|---|---|---|
| | No. | Layer configuration | Before bending test | After bending test |
| Example 3-1 | 1-1-2 | (X)/(Z1)/(Y)/(L)/(H) | 0.3 | 0.5 |
| Example 3-2 | 1-2-2 | (X)/(Z1)/(Y)/(L)/(H) | 0.3 | 0.5 |
| Example 3-3 | 1-3-2 | (X)/(Z 1)/(Y)/(L)/(H) | 0.3 | 0.5 |
| Example 3-4 | 1-4-2 | (X)/(Z1)/(Y)/(H) | 0.3 | 0.5 |
| Example 3-5 | 1-5-2 | (X)/(Z1)/(Y)/(H) | 0.3 | 0.5 |
| Example 3-6 | 1-6-2 | (X)/(Z1)/(Y)/(H) | 0.3 | 0.5 |
| Example 3-7 | 1-7-2 | (X)/(Z1)/(Y)/(H) | 0.3 | 0.5 |
| Example 3-8 | 1-8-2 | (X)/(Z1)/(Y)/(H) | 0.3 | 0.5 |
| Example 3-9 | 1-9-2 | (X)/(Z2)/(Y)/(H) | 1.9 | 2.0 |
| Example 3-10 | 1-10-2 | (X)/(Z3)/(Y)/(H) | 1.0 | 1.2 |

TABLE 4-continued

|  |  | Multilayer structure | Oxygen transmission rate [mL/(m² · day · atm)] | |
|---|---|---|---|---|
|  | No. | Layer configuration | Before bending test | After bending test |
| Example 3-11 | 1-11-2 | (X)/(Z3)/(Z1)/(Y)/(H) | 0.2 | 0.5 |
| Example 3-12 | 1-12-2 | (X)/(Z1)/(Z3)/(Y)/(H) | 0.2 | 0.5 |
| Comparative Example 3-1 | C1-1-2 | (X)/(Z1)/(H) | 3.0 | 7.0 |

As shown in Table 4, the flat pouches of the present invention maintained the gas barrier properties even when exposed to high physical stresses.

[Example 4] Paper Container

Example 4-1

In Example 4, a brick-type paper container 502 shown in FIG. 4 was fabricated and evaluated.

First, a 400 g/m² paperboard was prepared. A polyethylene resin was applied to both surfaces of this paperboard by extrusion lamination to form polyethylene resin layers (layers (H') each having a thickness of 20 μm) on both surfaces of the paperboard. After that, an adhesive layer (L) was formed on the surface of one of the polyethylene layers, onto which the base (X) of the multilayer structure (1-1-2) obtained in Example 1 was bonded. The adhesive layer (L) was formed by applying a two-component adhesive using a bar coater in such a manner that the dry thickness would be 3 μm, and then by drying the applied adhesive. This two-component adhesive used was an adhesive composed of "A-525S" of "TAKELAC" (registered trademark) manufactured by Mitsui Chemicals, Inc. and "A-50" of "TAKENATE" (registered trademark) manufactured by Mitsui Chemicals, Inc. In this way, a multilayer structure (4-1-3) having a configuration of "layer (H') (outer side)/paperboard/layer (H')/adhesive layer (L)/base (X)/layer (Z1)/layer (Y)/adhesive layer (L)/layer (H) (inner side)" was fabricated.

Next, the multilayer structure (4-1-3) was folded into a container shape in such a manner that the layer (H) of the multilayer structure (4-1-3) would face the interior of the container to be obtained. The multilayer structure folded into a container shape was subjected to heat sealing to fabricate a brick-type paper container (4-1) (having an inner volume of 500 mL). The polyethylene resin layer (layer (H')) and the layer (H) were heat-sealed at the center of one of the four side surfaces.

A circular sample (with a diameter of 6.5 cm) was cut out from a flat wall portion forming a side surface of the paper container (4-1) in such a manner that the circular sample did not include any of the folded portions. Next, the circular sample cut out was placed on a 10-cm-square aluminum foil (with a thickness of 30 μm) to cover a circular hole of 4.5 cm diameter made in the aluminum foil, and the gap between the sample and the aluminum foil was sealed with a two-component curable epoxy adhesive. The oxygen transmission rate of the sample was measured.

A 6.5 cm±9.0 cm area including no folded portions was cut out as a sample from a flat wall portion forming a side surface of the paper container (4-1). The sample was left in an atmosphere of 23° C. and 50% RH for 24 hours and stretching was then done in the same atmosphere by keeping the sample stretched by 3% in one direction corresponding to the longitudinal direction for 10 seconds. The oxygen transmission rate of the sample having undergone this stretching was measured.

Examples 4-2 to 4-12 and Comparative Example 4-1

Paper containers (4-2) to (4-12) and (C4-1) were fabricated in the same manner as in the fabrication of the paper container (4-1) of Example 4-1, except for using the multilayer structures (1-2-2) to (1-12-2) and the multilayer structure (C1-1-2) instead of the multilayer structure (1-1-2). The paper containers thus obtained were evaluated in the same manner as for the paper container (4-1). The multilayer structures used in the fabrication of these paper containers and the results of evaluation of the paper containers are shown in Table 5.

TABLE 5

|  | Multilayer structure | | Oxygen transmission rate [mL/(m² · day · atm)] | |
|---|---|---|---|---|
|  | No. | Layer configuration | Before stretching test | After stretching test |
| Example 4-1 | 1-1-2 | (X)/(Z1)/(Y)/(L)/(H) | 0.3 | 0.7 |
| Example 4-2 | 1-2-2 | (X)/(Z1)/(Y)/(L)/(H) | 0.3 | 0.7 |
| Example 4-3 | 1-3-2 | (X)/(Z1)/(Y)/(L)/(H) | 0.3 | 0.7 |
| Example 4-4 | 1-4-2 | (X)/(Z1)/(Y)/(H) | 0.3 | 0.7 |
| Example 4-5 | 1-5-2 | (X)/(Z1)/(Y)/(H) | 0.3 | 0.7 |
| Example 4-6 | 1-6-2 | (X)/(Z1)/(Y)/(H) | 0.3 | 0.7 |
| Example 4-7 | 1-7-2 | (X)/(Z1)/(Y)/(H) | 0.3 | 0.7 |
| Example 4-8 | 1-8-2 | (X)/(Z1)/(Y)/(H) | 0.3 | 0.7 |
| Example 4-9 | 1-9-2 | (X)/(Z2)/(Y)/(H) | 1.9 | 2.4 |
| Example 4-10 | 1-10-2 | (X)/(Z3)/(Y)/(H) | 1.0 | 1.5 |
| Example 4-11 | 1-11-2 | (X)/(Z3)/(Z1)/(Y)/(H) | 0.2 | 0.7 |
| Example 4-12 | 1-12-2 | (X)/(Z1)/(Z3)/(Y)/(H) | 0.2 | 0.7 |
| Comparative Example 4-1 | C1-1-2 | (X)/(Z1)/(H) | 3.0 | 12.0 |

As shown in Table 5, the paper containers of the present invention maintained the gas barrier properties even when exposed to high stretching stresses.

[Example 5] Strip Tape

In Example 5, a brick-type paper container including a strip tape was fabricated and evaluated. First, an adhesive layer (L) was formed on the base of the multilayer structure (1-1-2) fabricated in Example 1-1. A polyethylene resin was applied onto the adhesive layer (L) by extrusion coating lamination at 295° C. in such a manner that the applied resin had a thickness of 20 μm to form a layer (H'). The adhesive layer was formed by applying a two-component adhesive used in Example 1-1 using a bar coater in such a manner that the dry thickness would be 0.3 μm, and then by drying the applied adhesive. In this way, a multilayer structure (5-1-3) having a configuration of "layer (H')/adhesive layer (L)/base (X)/layer (Z1)/layer (Y)/adhesive layer (L)/layer (H)" was obtained. This multilayer structure (5-1-3) was cut into a strip shape. A strip tape was thus fabricated.

Next, a paper container was fabricated in the same manner as in Example 4-1. In Example 5, the polyethylene resin layer (H') and the layer (H) were heat-sealed at the center of one of the four side surfaces, and the heat-sealed portion lying at the center of one side surface was covered by the strip tape consisting of the multilayer structure (5-1-3). The portion covered by the strip tape was exposed to heat from the interior of the paper container to bond the multilayer structure to the paper container. A paper container (5-1) was thus fabricated.

A circular sample (with a diameter of 6.5 cm) was cut out from the paper container (5-1) in such a manner that as large a portion as possible of the sample was occupied by the bonded portion at the center of the side surface of the paper container. Next, the circular sample cut out was placed on a 10-cm-square aluminum foil (with a thickness of 30 μm) to cover a circular hole of 4.5 cm diameter made in the aluminum foil, and the gap between the sample and the aluminum foil was sealed with a two-component curable epoxy adhesive for measurement of the oxygen transmission rate. The oxygen transmission rate of the sample including the bonded portion was thus measured. As a result, the oxygen transmission rate of the bonded portion of the paper container (5-1) was 0.6 mL/(m$^2$·day·atm). The oxygen transmission rate of the bonded portion of the paper container (5-1) was 0.4 mL/(m$^2$·day·atm). This demonstrates that high oxygen barrier performance could be achieved by using the multilayer structure used in the present invention as a strip tape.

[Example 6] Container Lid

Example 6-1

A 100-mm-diameter circular piece of multilayer structure was cut out from the multilayer structure (1-1-2) fabricated in Example 1-1 and used as a lid for a container. A flanged container ("Hi-Retoflex" (registered trademark) "HR 78-84" (product name), manufactured by Toyo Seikan Co., Ltd.) was prepared as a container body. This container has the shape of a 30-mm-high cup whose top surface has a diameter of 78 mm. The top surface of the container is open, and the width of the flange portion formed along the periphery of the top surface is 6.5 mm. The container is made up of a three-layered product having a configuration of "olefin layer/steel layer/olefin layer".

Next, the container body was almost completely filled with water, and the lid was heat-sealed to the flange portion, thus obtaining a lidded container (6-1). In this heat sealing of the lid, the lid was set in such a manner that the polyethylene resin layer of the lid was in contact with the flange portion. A measurement sample was cut out from the lid of the lidded container (6-1) and subjected to measurement of the oxygen transmission rate.

In a corrugated fiberboard box (15±35±45 cm) were placed 10 lidded containers (6-1). A gap between the lidded containers (6-1) and the corrugated fiberboard box was filled with a buffer material. The corrugated fiberboard box containing the lidded containers (6-1) was loaded onto a truck, and a transportation test was conducted in which the truck was allowed to run back and forth 10 times between Okayama and Tokyo (with a distance of about 700 km). Each lidded container (6-1) having undergone the transportation test was left at 20° C. and 65% RH for 1 hour, after which a hole was made in the bottom of the container body to drain water. Subsequently, a measurement sample was cut out from the lid of each lidded container (6-1) and was subjected to measurement of the oxygen transmission rate.

Examples 6-2 to 6-12 and Comparative Example 6-1

Lidded containers (6-2) to (6-12) and (C6-1) were fabricated in the same manner as in the fabrication of the lidded container (6-1) of Example 6-1, except for using the multilayer structures (1-2-2) to (1-12-2) and the multilayer structure (C1-1-2) instead of the multilayer structure (1-1-2). The lidded containers thus obtained were evaluated in the same manner as for the lidded container (6-1). The multilayer structures included in these lidded containers and the results of evaluation of the lidded containers are shown in Table 6.

TABLE 6

| | Multilayer structure | | Oxygen transmission rate [mL/(m$^2$ · day · atm)] | |
|---|---|---|---|---|
| | | | Before trans-portation | After trans-portation |
| | No. | Layer configuration | test | test |
| Example 6-1 | 1-1-2 | (X)/(Z1)/(Y)/(L)/(H) | 0.3 | 0.5 |
| Example 6-2 | 1-2-2 | (X)/(Z1)/(Y)/(L)/(H) | 0.3 | 0.5 |
| Example 6-3 | 1-3-2 | (X)/(Z1)/(Y)/(L)/(H) | 0.3 | 0.5 |
| Example 6-4 | 1-4-2 | (X)/(Z1)/(Y)/(H) | 0.3 | 0.5 |
| Example 6-5 | 1-5-2 | (X)/(Z1)/(Y)/(H) | 0.3 | 0.5 |
| Example 6-6 | 1-6-2 | (X)/(Z1)/(Y)/(H) | 0.3 | 0.5 |
| Example 6-7 | 1-7-2 | (X)/(Z1)/(Y)/(H) | 0.3 | 0.5 |
| Example 6-8 | 1-8-2 | (X)/(Z1)/(Y)/(H) | 0.3 | 0.5 |
| Example 6-9 | 1-9-2 | (X)/(Z2)/(Y)/(H) | 1.9 | 2.0 |
| Example 6-10 | 1-10-2 | (X)/(Z3)/(Y)/(H) | 1.0 | 1.2 |
| Example 6-11 | 1-11-2 | (X)/(Z3)/(Z1)/(Y)/(H) | 0.2 | 0.5 |
| Example 6-12 | 1-12-2 | (X)/(Z1)/(Z3)/(Y)/(H) | 0.2 | 0.5 |
| Comparative Example 6-1 | C1-1-2 | (X)/(Z1)/(H) | 3.0 | 7.0 |

As shown in Table 6, the lidded containers of the present invention maintained the gas barrier properties even when exposed to high physical stresses.

[Example 7] Vacuum Insulator

Example 7-1

In Example 7, a vacuum insulator 602 shown in FIG. 5 was fabricated and evaluated.

An adhesive layer (L) was formed on an ONY. This adhesive layer was formed by applying a two-component adhesive using a bar coater in such a manner that the dry thickness would be 3 μm, and then by drying the applied adhesive. This two-component adhesive used was an adhesive composed of "A-525S" of "TAKELAC" (registered trademark) manufactured by Mitsui Chemicals, Inc. and "A-50" of "TAKENATE" (registered trademark) manufactured by Mitsui Chemicals, Inc. Then, this ONY was laminated to the base (X) of the multilayer structure (1-1-2) obtained in Example 1-1. In this way, a multilayer structure (7-1-3) having a configuration of "ONY/adhesive layer (L)/base (X)/layer (Z1)/layer (Y)/adhesive layer (L)/layer (H)" was obtained.

The multilayer structure (7-1-3) was cut to obtain two laminates with a size of 70 cm±30 cm. The two laminates were stacked together in such a manner that the layers (H) would form inner surfaces of a bag to be fabricated, and the stack was heat-sealed at its three sides with a seal width of 10 mm. A three-side-seal bag was thus fabricated. Next, a heat-insulating core material was put into the three-side-seal bag through its opening, and the three-side-seal bag was hermetically closed using a vacuum packaging machine (VAC-STAR 2500, manufactured by Frimark GmbH) so that the internal pressure was 10 Pa at 20° C. In this way, a vacuum insulator (7-1) was obtained. The heat-insulating core material used was a fine silica powder dried in an atmosphere at 120° C. for 4 hours. The vacuum insulator (7-1) was left at 40° C. and 15% RH for 360 days, after which the pressure of the interior of the vacuum insulator was measured using a Pirani gauge.

Examples 7-2 to 7-12 and Comparative Example 7-1

Vacuum insulators (7-2) to (7-12) and (C7-1) were fabricated in the same manner as in the fabrication of the vacuum insulator (7-1) of Example 7-1, except for using the multilayer structures (1-2-2) to (1-12-2) and the multilayer structure (C1-1-2) instead of the multilayer structure (1-1-2). The vacuum insulators thus obtained were evaluated in the same manner as for the vacuum insulator (7-1). The multilayer structures included in these vacuum insulators and the results of evaluation of the vacuum insulators are shown in Table 7.

TABLE 7

|  | Multilayer structure | | Internal pressure after leaving [Pa] |
|---|---|---|---|
|  | No. | Layer configuration |  |
| Example 7-1 | 1-1-2 | (X)/(Z1)/(Y)/(L)/(H) | 37.0 |
| Example 7-2 | 1-2-2 | (X)/(Z1)/(Y)/(L)/(H) | 38.0 |
| Example 7-3 | 1-3-2 | (X)/(Z1)/(Y)/(L)/(H) | 45.0 |
| Example 7-4 | 1-4-2 | (X)/(Z1)/(Y)/(H) | 50.0 |
| Example 7-5 | 1-5-2 | (X)/(Z1)/(Y)/(H) | 35.0 |
| Example 7-6 | 1-6-2 | (X)/(Z1)/(Y)/(H) | 31.0 |
| Example 7-7 | 1-7-2 | (X)/(Z1)/(Y)/(H) | 45.0 |
| Example 7-8 | 1-8-2 | (X)/(Z1)/(Y)/(H) | 50.0 |
| Example 7-9 | 1-9-2 | (X)/(Z2)/(Y)/(H) | 37.0 |
| Example 7-10 | 1-10-2 | (X)/(Z3)/(Y)/(H) | 63.0 |
| Example 7-11 | 1-11-2 | (X)/(Z3)/(Z1)/(Y)/(H) | 53.0 |
| Example 7-12 | 1-12-2 | (X)/(Z1)/(Z3)/(Y)/(H) | 50.0 |
| Comparative Example 7-1 | C1-1-2 | (X)/(Z1)/(H) | 630.0 |

As shown in Table 7, the vacuum insulators of the present invention maintained the gas barrier properties for a long period of time.

INDUSTRIAL APPLICABILITY

The present invention is applicable to a multilayer structure, a packaging material including the multilayer structure, and a method for producing a multilayer structure. According to the present invention, it is possible to obtain a multilayer structure having good gas barrier properties by extrusion coating lamination. The use of the multilayer structure of the present invention can provide a good packaging material.

DESCRIPTION OF REFERENCE NUMERALS

10 Extrusion coating lamination apparatus
11 Extruder
12 T-die
13 Cooling roll
14 Rubber roll
101 Layered product
102 Resin film
103 Laminated film (multilayer structure)
201 Flat pouch
210, 631, 632 Film material (multilayer structure)
211 Sealed portion
220 Separation barrier
301 Laminated tube container
311 End sealed portion
312 Side sealed portion
331 Body portion
332 Shoulder portion
341 Base portion
342 Outlet portion
502 Paper container
520, 620 Separation barrier
521 Side surface
522 Bottom surface
523 Top portion
601, 602 Vacuum insulator
610 Sheath material
651, 652 Core material

The invention claimed is:

1. A multilayer structure comprising a layered product and a layer (H) stacked on the layered product, wherein
the layered product comprises a base (X), a layer (Z) comprising an aluminum atom, and a layer (Y) comprising a compound (A) comprising a phosphorus atom,
the layer (H) comprises a thermoplastic resin (U),
the thermoplastic resin (U) is a polymer comprising an α-olefin unit,
the layer (Z) comprises a layer (Z1) comprising a reaction product (E),
the reaction product (E) is a reaction product formed by a reaction between a metal oxide (C) comprising an aluminum atom and a phosphorus compound (D), and
in an infrared absorption spectrum of the layer (Z1), a maximum absorption wavenumber in a region of 800 to 1,400 cm$^{-1}$ is 1,080 to 1,130 cm$^{-1}$.

2. The multilayer structure according to claim 1, wherein the layered product comprises at least one pair of the layer (Z) and the layer (Y) that are disposed contiguous to each other.

3. The multilayer structure according to claim 1, wherein the layer (Z) comprises a deposited layer (Z2) of aluminum or a deposited layer (Z3) of aluminum oxide.

4. The multilayer structure according to claim 1, wherein the compound (A) is a polymer (Aa) having at least one functional group selected from the group consisting of a phosphoric acid group, a phosphorous acid group, a phosphonic acid group, a phosphonous acid group, a phosphinic acid group, and a phosphinous acid group.

5. The multilayer structure according to claim 1, wherein the base (X) comprises at least one selected from the group consisting of a thermoplastic resin film layer and a paper layer.

6. The multilayer structure according to claim 1, wherein the thermoplastic resin (U) is polyethylene.

7. The multilayer structure according to claim 1, wherein the thermoplastic resin (U) is a copolymer comprising an α-olefin unit and a vinyl monomer unit having a polar group.

8. The multilayer structure according to claim 7, wherein the vinyl monomer unit having a polar group is a vinyl monomer unit having a carboxyl group.

9. The multilayer structure according to claim 1, wherein the compound (A) is poly(vinylphosphonic acid).

10. The multilayer structure according to claim 1, wherein the layer (H) is a layer formed by extrusion coating lamination.

11. The multilayer structure according to claim 1, having an oxygen transmission rate of 2 mL/(m²·day·atm) or less at 20° C. and 85% RH.

12. A packaging material comprising the multilayer structure according to claim 1.

13. A method for producing the multilayer structure according to claim 1, the method comprising:
   forming the layered product comprising a base (X), a layer (Z) comprising an aluminum atom, and a layer (Y) comprising a compound (A) comprising a phosphorus atom; and
   forming the layer (H) stacked on at least one surface of the layered product by extruding a molten thermoplastic resin (U) onto the surface of the layered product.

14. The method according to claim 13, wherein the forming of the layered product comprises:
   preparing a coating liquid (S) comprising the compound (A) and a solvent; and
   forming the layer (Y) on the layer (Z) using the coating liquid (S).

15. The method according to claim 13, wherein in the forming of the layered product, the layer (Z) and the layer (Y) are formed contiguous to each other.

16. A multilayer structure comprising a layered product and a layer (H) stacked on the layered product, wherein
   the layered product comprises a base (X), a layer (Z) comprising an aluminum atom, and a layer (Y) comprising a compound (A) comprising a phosphorus atom,
   the layer (H) comprises a thermoplastic resin (U),
   the thermoplastic resin (U) is a polymer comprising an α-olefin unit, and
   the compound (A) is a polymer (Aa) having at least one functional group selected from the group consisting of a phosphoric acid group, a phosphorous acid group, a phosphonic acid group, a phosphonous acid group, a phosphinic acid group, and a phosphinous acid group.

17. A multilayer structure comprising a layered product and a layer (H) stacked on the layered product, wherein
   the layered product comprises a base (X), a layer (Z) comprising an aluminum atom, and a layer (Y) comprising a compound (A) comprising a phosphorus atom,
   the layer (H) comprises a thermoplastic resin (U), and
   the thermoplastic resin (U) is a copolymer comprising an α-olefin unit and a vinyl monomer unit having a polar group, wherein the vinyl monomer unit having a polar group is a vinyl monomer unit having a carboxyl group.

* * * * *